(12) United States Patent
Sugimura

(10) Patent No.: US 11,285,876 B2
(45) Date of Patent: Mar. 29, 2022

(54) DROP-OFF MECHANISM-EQUIPPED ATTACHMENT STRUCTURE FOR IN-VEHICLE DEVICE

(71) Applicant: MURAKAMI CORPORATION, Shizuoka (JP)

(72) Inventor: Naomi Sugimura, Shimada (JP)

(73) Assignee: MURAKAMI CORPORATION, Shizuoka (JP)

( * ) Notice: Subject to any disclaimer, the term of this patent is extended or adjusted under 35 U.S.C. 154(b) by 65 days.

(21) Appl. No.: 16/491,779

(22) PCT Filed: Feb. 7, 2018

(86) PCT No.: PCT/JP2018/004217
§ 371 (c)(1),
(2) Date: Sep. 6, 2019

(87) PCT Pub. No.: WO2018/168265
PCT Pub. Date: Sep. 20, 2018

(65) Prior Publication Data
US 2020/0391660 A1 Dec. 17, 2020

(30) Foreign Application Priority Data

Mar. 13, 2017 (JP) .............................. JP2017-047693

(51) Int. Cl.
*B60R 1/04* (2006.01)
*B60R 1/12* (2006.01)
(Continued)

(52) U.S. Cl.
CPC .................. *B60R 1/04* (2013.01); *B60R 1/12* (2013.01); *B60R 11/0235* (2013.01);
(Continued)

(58) Field of Classification Search
CPC .......... B60R 1/04; B60R 1/12; B60R 11/0235; B60R 2001/1215; B60R 2011/0026; F16F 1/26
(Continued)

(56) References Cited

U.S. PATENT DOCUMENTS 3,131,251 A * 4/1964 Ryan .......................... B60R 1/04
248/467
3,928,894 A * 12/1975 Bury .......................... B60R 1/04
248/467
(Continued)

FOREIGN PATENT DOCUMENTS

JP 2-136735 11/1990
JP 3-9936 1/1991
(Continued)

OTHER PUBLICATIONS

International Search Report issued in International Bureau of WIPO Patent Application No. PCT/JP2018/004217, dated Mar. 13, 2018, (with an English translation thereof).
(Continued)

*Primary Examiner* — Eret C McNichols
*Assistant Examiner* — Michael McDuffie
(74) *Attorney, Agent, or Firm* — Greenblum & Bernstein, P.L.C.

(57) ABSTRACT

An attachment structure includes a support part for an in-vehicle device, a plate spring attached to the support part, and a screw screwed into the support part. The attachment base slides and is received in a space interposed between left and right plate spring pieces. The screw is fastened in this state. A screw distal end presses a front surface of the attachment base to generate an appropriate force of fitting between the attachment base and the left and right plate spring pieces and thereby the attachment base and the plate (Continued)

spring are elastically fitted with each other. The in-vehicle device is attached to the attachment base via the plate spring using the elastic fitting. If an external force that is equal to or exceeds a predetermined value is applied to the in-vehicle device, the elastic fitting is cancelled and the in-vehicle device drops off from the attachment base.

13 Claims, 17 Drawing Sheets

(51) Int. Cl.
  *B60R 11/02* (2006.01)
  *B60R 11/00* (2006.01)
  *F16F 1/26* (2006.01)
(52) U.S. Cl.
  CPC ............ *B60R 2001/1215* (2013.01); *B60R 2011/0026* (2013.01); *F16F 1/26* (2013.01)
(58) Field of Classification Search
  USPC .... 248/549, 548, 466, 475.1, 476, 479, 481, 248/494, 495, 220.22, 221.11, 222.11, 248/222.12, 222.13; 359/871, 872, 873
  See application file for complete search history.

(56) References Cited

U.S. PATENT DOCUMENTS

| | | | | |
|---|---|---|---|---|
| 4,645,316 A * | 2/1987 | Ohyama | ............... | B60R 1/04 248/467 |
| 4,930,742 A * | 6/1990 | Schofield | ............... | B60R 1/04 248/225.11 |
| 4,936,533 A * | 6/1990 | Adams | ............... | B60R 1/04 248/222.11 |
| 5,377,948 A * | 1/1995 | Suman | ............... | B60R 1/04 248/549 |
| 5,788,205 A * | 8/1998 | Hansen | ............... | B60R 1/04 248/468 |
| 5,820,097 A * | 10/1998 | Spooner | ............... | B60R 1/04 248/549 |
| 5,931,440 A | 8/1999 | Miller | | |
| 5,966,255 A | 10/1999 | Mochizuki et al. | | |
| 7,717,394 B2 | 5/2010 | Tanaka et al. | | |
| 9,156,403 B2 | 10/2015 | Rawlings et al. | | |
| 9,174,577 B2 | 11/2015 | Busscher et al. | | |
| 9,475,531 B2 | 10/2016 | Rawlings et al. | | |
| 9,682,656 B2 | 6/2017 | Busscher et al. | | |
| 2007/0228247 A1 | 10/2007 | Tanaka et al. | | |
| 2008/0315060 A1 * | 12/2008 | Muller | ............... | B60R 1/04 248/475.1 |
| 2011/0299185 A1 | 12/2011 | Rawlings et al. | | |
| 2013/0062497 A1 * | 3/2013 | Van Huis | ............... | B60R 1/04 248/479 |
| 2014/0055617 A1 * | 2/2014 | Minikey, Jr | ............... | F16F 1/32 348/148 |
| 2014/0063630 A1 | 3/2014 | Busscher et al. | | |
| 2014/0175250 A1 * | 6/2014 | Chieppa | ............... | B60R 1/04 248/475.1 |
| 2015/0224928 A1 * | 8/2015 | Busscher | ............... | F16B 21/073 224/539 |
| 2016/0023605 A1 | 1/2016 | Busscher et al. | | |
| 2016/0031503 A1 | 2/2016 | Rawlings et al. | | |
| 2016/0159287 A1 * | 6/2016 | Minikey, Jr. | ............... | H05K 9/0045 250/2 UAL |
| 2018/0011320 A1 * | 1/2018 | Chen | ............... | G02B 27/0149 |
| 2018/0195661 A1 * | 7/2018 | Filipiak | ............... | F16M 11/14 |
| 2020/0101901 A1 * | 4/2020 | Lundy | ............... | B60R 1/04 |
| 2020/0361379 A1 * | 11/2020 | Sugimura | ............... | B60R 1/04 |
| 2020/0361380 A1 * | 11/2020 | Sugimura | ............... | B60R 1/12 |

FOREIGN PATENT DOCUMENTS

| | | |
|---|---|---|
| JP | 11-170912 | 6/1999 |
| JP | 4713386 | 6/2011 |

OTHER PUBLICATIONS

Written Opinion of the International Searching Authority issued in International Bureau of WIPO Patent Application No. PCT/JP2018/004217, dated Mar. 13, 2018, (with an English translation thereof).

\* cited by examiner

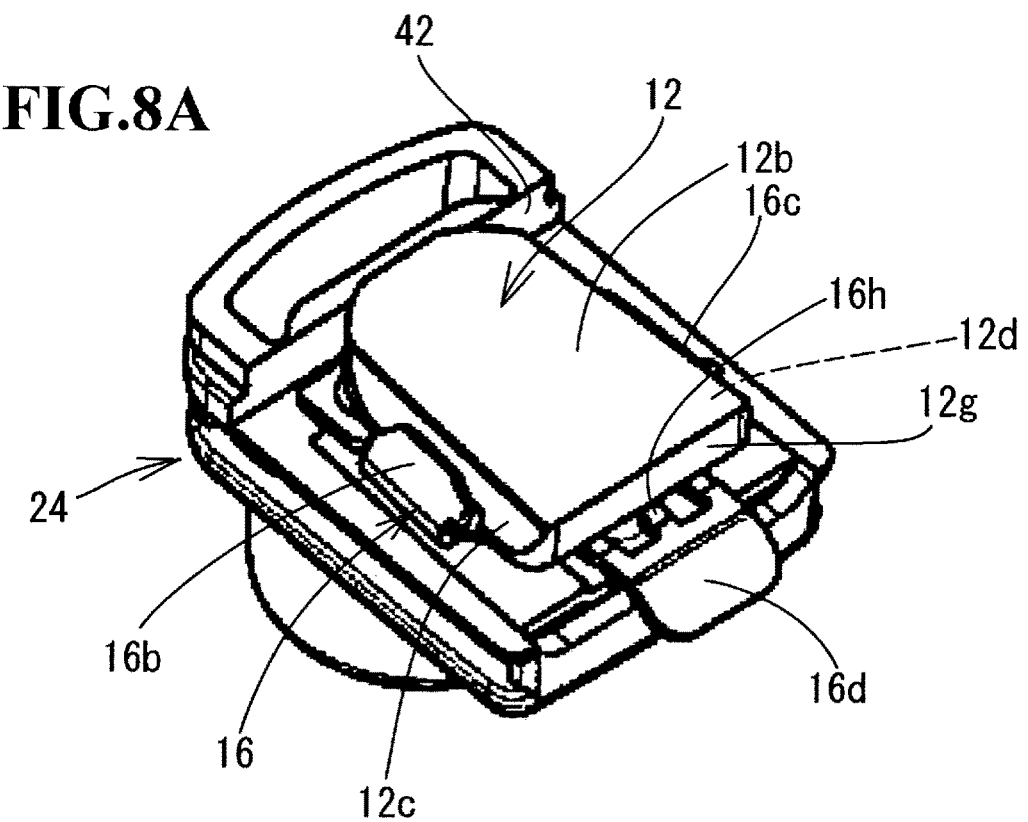
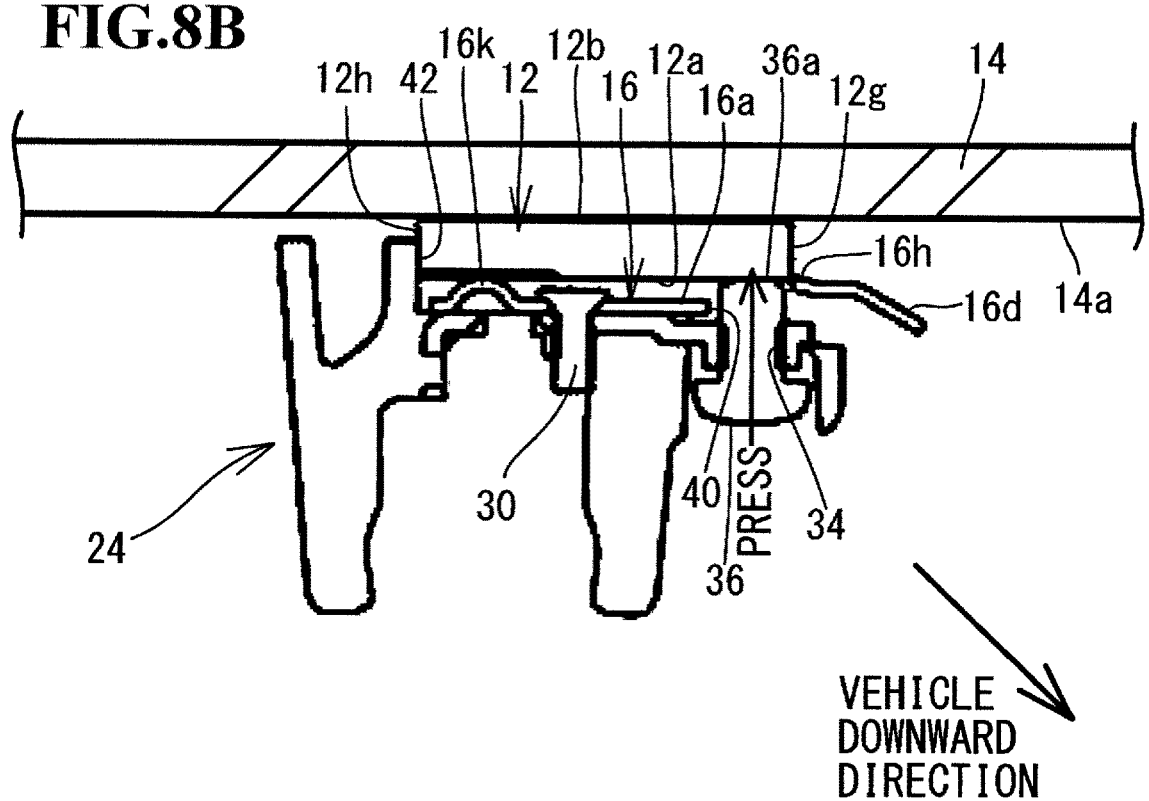

DROP-OFF MECHANISM-EQUIPPED ATTACHMENT STRUCTURE FOR IN-VEHICLE DEVICE

The disclosure of Japanese Patent Application No. JP2017-047693 filed on Mar. 13, 2017 including the specification, drawings, claims and abstract is incorporated herein by reference in its entirety.

TECHNICAL FIELD

This invention relates to an attachment structure that attaches an in-vehicle device to an attachment base fixed to a vehicle interior in such a manner that the in-vehicle device can drop off, the attachment structure both enabling easy attachment of the in-vehicle device to the attachment base and less occurrence of backlash after the attachment.

BACKGROUND ART

An inner mirror, which is one of in-vehicle devices, is equipped with what is called an avoidance function in order to ensure safety of occupants. The avoidance function is a function that, when a large shock is applied to an inner mirror body as a result of, e.g., the head of an occupant hitting an inner mirror body, causes the inner mirror body to drop off together with a stay from an upper part of a vehicle interior to ensure safety of the occupant (that is, protects the occupant from injury). As an attachment structure that attaches an in-vehicle device to a vehicle interior in such a manner that the in-vehicle device can drop off in order to have an avoidance function, an attachment structure for an inner mirror, which is an in-vehicle viewing device, is described in each of Patent Literatures 1 to 3. Each of the inner mirrors described in the patent literatures includes an inner mirror body (an in-vehicle device body or an in-vehicle viewing device body) and a stay (support part). The inner mirror body is attached to a front part of a vehicle interior via the stay. The attachment structure is a structure in which an attachment base called, e.g., a wedge mount button is bonded and fixed to a surface on the vehicle interior side of a front windshield and the stay is attached to the attachment base so as to be capable of dropping off. In other words, each of the attachment structures described in Patent Literatures 1 and 2 includes a structure in which a plate spring is attached to the stay and the stay is attached to the attachment base via the plate spring.

The plate spring includes left and right pieces disposed so as to face each other in a left-right direction of the vehicle (left and right plate spring pieces). The stay is attached to the attachment base so as to be capable of dropping off, by sliding and pushing the attachment base into a space interposed between the left and right plate spring pieces against a spring force of the left and right plate spring pieces. The attachment structure described in Patent Literature 3 includes a channel (groove) in each of left and right wall surfaces of a recess of the stay. The stay is attached to the attachment base by sliding left and right edges of the attachment base into the left and right channels of the stay, respectively. An acute screw is screwed into the stay. The stay is fixed to the attachment base by making a distal end of the screw dig into and press a surface of the attachment base.

CITATION LIST

Patent Literature

Patent Literature 1: Japanese Patent No. 4713386
Patent Literature 2: U.S. Pat. No. 9,174,577
Patent Literature 3: U.S. Pat. No. 9,156,403
Patent Literature 4: Microfilm of Japanese Utility Model Application No. H01-046203 (Japanese Utility Model Laid-Open No. H02-136735)
Patent Literature 5: Japanese Patent Laid-Open No. H11-170912, official gazette

SUMMARY OF INVENTION

Technical Problem

According to the attachment structures described in Patent Literatures 1 and 2, when the stay is attached to the attachment base, large force is necessary for sliding and pressing the attachment base into the space interposed between the left and right plate spring pieces against the spring force of the left and right plate spring pieces. In other words, sliding resistance is large. Therefore, the attachment is not easy. Corresponding to this, if the spring force of the left and right plate spring pieces is decreased in order to facilitate the attachment, instead, a strength for supporting the stay to the attachment base becomes insufficient. As a result of this, for example, during running of the vehicle, backlash occurs in the stay and the inner mirror body is subjected to chatter vibration, which deteriorates visibility of the mirror. Also, in the attachment structure described in Patent Literature 3, the pressing against the attachment base by the screw easily weakens. If the pressing weakens, the strength for supporting the stay to the attachment base becomes insufficient. As a result of this, for example, during running of the vehicle, backlash occurs in the stay and the inner mirror body is subjected to chatter vibration, which deteriorates visibility of the mirror. In particular, in the attachment structure described in Patent Literature 3, friction between the acute distal end of the screw and the front surface of the attachment base due to vibration of the vehicle causes abrasion of the acute distal end of the screw or causes the acute distal end of the screw to deeply dig into the front surface of the attachment base. Therefore, backlash is likely to occur early. Also, in recent years, electronic mirrors are prevailing; however, an inner mirror body of an electronic mirror is substantially heavier than that of a conventional non-electronic mirror (inner mirror using a reflective mirror with no image display device mounted therein) because of an image display device such as a liquid-crystal display being mounted therein. Therefore, the problem of vibration of the inner mirror body due to insufficiency of strength for supporting the stay to the attachment base is becoming pronounced. Also, none of the attachment structures described in Patent Literatures 1 to 3 enables adjustment of strength of attachment of the stay to the attachment base.

This invention is intended to solve the aforementioned problems in the conventional techniques and provide a drop-off mechanism-equipped attachment structure for an in-vehicle device, the attachment structure both enabling easy attachment of an in-vehicle device to an attachment base and less occurrence of backlash after the attachment.

Solution to Problem

A drop-off mechanism-equipped attachment structure according to this invention is an attachment structure for an in-vehicle device, the attachment structure attaching an in-vehicle device to an attachment base fixed to a vehicle interior in such a manner that the in-vehicle device can drop off, the attachment structure comprising a support part of the in-vehicle device, a plate spring attached to the support part and a screw screwed into the support part, wherein: the plate spring includes left and right plate spring pieces facing each other with a space interposed therebetween; the plate spring has a structure that allows the attachment base to slide into the space and thereby receives the attachment base and causes the attachment base to be fitted in the plate spring in a direction orthogonal to a direction of the sliding-in by the reception; the screw is fastened in a state in which the attachment base is fitted in the plate spring and screwed into the support part so that a front surface of the attachment base is pressed by a screw distal end that is a distal end of the screw to generate an appropriate force of fitting between the attachment base and the left and right plate spring pieces and thereby cause the attachment base and the left and right plate spring pieces to be elastically fitted together; and the attachment structure attaches the in-vehicle device to the attachment base via the plate spring using the elastic fitting, and if an external force that is equal to or exceeds a predetermined value is applied to the in-vehicle device attached to the attachment base, cancels the elastic fitting and causes the in-vehicle device to drop off from the attachment base. Accordingly, when the attachment base is slid into the space interposed between the left and right plate spring pieces, the force of fitting between the attachment base and the left and right plate spring pieces can be decreased by loosening the screw. Consequently, the sliding-in can be performed with small sliding resistance. Therefore, attachment of the in-vehicle device to the attachment base is facilitated, improving assemblability of the in-vehicle device to the attachment base. In addition, the force of fitting between the attachment base and the left and right plate spring pieces can be increased by fastening the screw after sliding of the attachment base into the space interposed between the left and right plate spring pieces. Consequently, a strength for supporting the in-vehicle device to the stay (fitting holding force) is enhanced, enabling less occurrence of backlash. As a result of adjustment of the fitting force being enabled like this, attachment is not difficult even if a plate spring having a strong spring force is used, and thus, a plate spring having a strong spring force can be used. Therefore, design favorable for support of a heavy electronic mirror or a large inner mirror can easily be provided. Also, even if pressing against the attachment base by the screw tends to weaken, such weakening of pressing is absorbed by the plate spring and thus such weakening of pressing is less likely to occur. Therefore, it is possible that backlash is less likely to occur even if the vehicle is used for a long period of time.

In the attachment structure according to this invention, it is possible that the force of fitting between the attachment base and the left and right plate spring pieces can be adjusted using an amount of fastening of the screw. Accordingly, a strength of attachment of the in-vehicle device to the attachment base can be adjusted by adjusting the force of fitting between the attachment base and the left and right plate spring pieces using a combination of the plate spring and the screw. Therefore, the attachment strength can be set to be a proper strength according to, e.g., the weight of the in-vehicle device. For example, if a heavy in-vehicle device is attached, the amount of fastening of the screw can be increased in comparison with a case where a light in-vehicle device is attached. Consequently, the strength of attachment of the in-vehicle device can be increased by increasing the force of fitting between the attachment base and the left and right plate spring pieces.

In the attachment structure according to this invention, it is possible that: the support part includes a protrusion that abuts on a position in the front surface of the attachment base, the position being different from a position where the screw distal end abuts; and a direction in which the screw distal end and the protrusion are aligned, the direction being a direction in which the screw distal end and the protrusion face each other, is set to be a direction intersecting with a direction in which the left and right plate spring pieces face each other. Accordingly, the support part of the in-vehicle device can be supported on the front surface of the attachment base by the screw distal end and the protrusion which are disposed in the direction intersecting with the direction in which the left and right plate spring pieces face each other. As a result, the in-vehicle device can be stably supported on the attachment base.

In the attachment structure according to this invention, it is possible that the screw distal end and the protrusion are disposed at respective positions on opposite outer sides of a region in which the left and right plate spring pieces face each other with the region interposed therebetween. Accordingly, the attachment base is supported by the screw distal end and the protrusion at the respective positions on the opposite sides of a part on which the plate spring is fitted with the part interposed therebetween, enabling the plate spring to be fitted on the attachment base in a state in which the attachment base is stably supported.

In the attachment structure according to this invention, it is possible that the screw is formed of one screw, and the protrusion is formed of two projections aligned in a direction parallel to the direction in which the left and right plate spring pieces face each other. Accordingly, the in-vehicle device can be supported on the front surface of the attachment base via three points that are a distal end of one screw and two projections. As a result, the in-vehicle device can more stably be supported on the attachment base.

In this invention, it is possible that the screw distal end has a non-acute shape. Accordingly, in comparison with a case where the screw distal end has an acute shape, abrasion due to friction between the screw distal end and the front surface of the attachment base is less likely to occur, enabling even less occurrence of backlash. Even if the screw distal end has a non-acute shape (that is, even if an acute distal end of a screw is not made to dig into a front surface of an attachment base), the fitting force is provided by the plate spring, and thus, the in-vehicle device can be supported with no backlash.

In the attachment structure according to this invention, it is possible that: the plate spring includes a lug at a position at which the lug faces the attachment base when the attachment base slides into the plate spring; the lug includes a hook; and when the attachment base is slid in, the attachment base slides into the space while making the lug elastically deform and climbing over the hook, and upon the attachment base reaching a predetermined attachment position after climbing over the hook, the hook engages with a predetermined position in the attachment base via elasticity of the lug and thereby suppresses backward movement of the attachment base. Accordingly, upon the attachment base being slid in and the attachment base reaching the predetermined attachment position, the hook engages with the attachment base, enabling backward movement of the attachment base. Also, a person who performs the attachment work feels a click when the hook engages with the attachment base and thus can easily perceive that the attachment base has reached the predetermined attachment position. Also, the in-vehicle device can be removed from the attachment base by pushing the lug down with a finger or a tool to cause the lug to elastically deform from the state in which the hook engages with the attachment base to cancel the engagement. Consequently, e.g., repair or replacement of the in-vehicle device becomes possible.

In the attachment structure according to this invention, it is possible that the lug includes an opening that allows entry of the screw distal end. Accordingly, the front surface of the attachment base can be pressed by the screw distal end by making the screw distal end enter through the opening of the lug. Also, the lug has the opening and thus easily elastically deforms and thus the hook and the attachment base can be disengaged from each other by easily causing the lug to elastically deform with a hand or a tool.

In the attachment structure according to this invention, it is possible that: the support part includes a support part base with the plate spring attached thereto, and a support part body that is pivotally joined to the support part base via a pivoting connection part and supports an in-vehicle device body of the in-vehicle device; and if an external force is applied to the support part body, before the elastic fitting is cancelled, the support part body pivots relative to the support part base with the pivoting connection part as a center to allow the external force to escape, and if an external force that is equal to or exceeds a predetermined value is further applied to the support part body after the pivoting of the support part body is mechanically stopped at an end of a pivoting range, the elastic fitting provided by the plate spring is cancelled and the in-vehicle device drops off from the attachment base. Accordingly, an avoidance action can be performed in two steps. In other words, for a small shock, an avoidance operation is performed by making the support part body to pivot with the pivoting connection part as a center. At this time, the support part body just pivots and does not drop off, and thus can easily be restored. Also, for a large shock, after pivoting of the support part body is mechanically stopped at the end of the pivoting range, the elastic fitting provided by the plate spring is cancelled and the in-vehicle device drops off from the attachment base. Consequently, safety of an occupant is ensured. Furthermore, if adjustment of a height of the in-vehicle device body is made to be possible using an angle of pivoting of the support part body relative to the support part base, the stay can be shared by a plurality of types of vehicles that are different in ceiling height (thus, different in height at which the support part base is attached). In addition, a driver can adjust the height of the in-vehicle device body via his/her own operation.

In the attachment structure according to this invention, it is possible that: the support part base includes a pivoting stopping part that defines the pivoting range for the support part body; and if an angle of pivoting of the support part body reaches a predetermined value, the pivoting stopping part abuts on a pivoting stopped part of the support part body and mechanically prevents further pivoting of the support part body. Accordingly, the second avoidance action for a large shock can reliably be made to function.

In the attachment structure according to this invention, it is possible that the support part body can evacuate (that is, can be moved away) from the position for handling of the screw by making the support part body pivot via the pivoting connection part. Accordingly, when the screw is handled, the support part body can be prevented from interrupting the handling.

In the attachment structure according to this invention, it is possible that a pivot axis of the pivoting connection part is configured to be disposed in a position in which the pivot axis extends in a direction that is a vehicle width direction and a horizontal direction when the attachment structure is mounted in a vehicle. Accordingly, the pivot axis enables the first-step avoidance to be an action of avoidance to the front side of the vehicle. Also, since the pivot axis is a single axis, vibration in a direction other than a direction around the pivot axis can be suppressed.

In the attachment structure according to this invention, it is possible that: the pivoting connection part has a structure in which the support part base and the support part body are joined via a joining screw disposed on the pivot axis in such a manner that the support part base and the support part body can pivot relative to each other; the support part base and the support part body include respective abutment surfaces disposed so as to abut on each other directly or indirectly via another member and be slidable relative to each other in a direction around the pivot axis, at the pivoting connection part; an abutment surface pressing spring that causes the abutment surfaces to be pressed against each other is disposed between the pivoting connection part and the joining screw; and a magnitude of an external force necessary for causing the support part body to pivot can be adjusted by adjusting a force of pressing the abutment surfaces against each other with an amount of fastening of the joining screw, the force being provided by the abutment surface pressing spring. Accordingly, a holding force of the support part base holding the support part body can be adjusted by adjusting the force of pressing the abutment surfaces against each other with the amount of fastening of the joining screw, the force being provided by the abutment surface pressing spring. Therefore, if the support part body is long and/or if the mirror body is heavy, chatter vibration of the mirror body during running of the vehicle can be suppressed by enhancing the holding force. Also, a magnitude of an external force necessary for causing the support part body to pivot in the first-step avoidance action can be adjusted by adjustment of the holding force. Furthermore, since the abutment surface pressing spring is disposed between the pivoting connection part and the joining screw, the holding force can finely be adjusted using the amount of fastening of the joining screw, and even if the joining screw is loosened to some extent, a substantial decrease of the holding force of the support part base holding the support part body can be suppressed.

BRIEF DESCRIPTION OF DRAWINGS

FIGS. 5A and 5B to 8A, 8B, 8C and 8D are diagrams illustrating an attachment procedure for obtaining the state in FIG. 2 in which the inner mirror is attached to the attachment base, each of the diagrams illustrating the stay base and the attachment base. From among these figures, FIG. 5A is a perspective diagram illustrating a state immediately before sliding of the attachment base into the stay base.

FIG. 5B is a vertical sectional view of the stay base and the attachment base in the state in FIG. 5A cut at a center position in a width direction of the stay base along a direction of the sliding-in of the attachment base. However, the sectional view partly includes a section cut at a position of a projection (protrusion), off the center position.

FIG. 8A is a perspective diagram illustrating a state in which the attachment of the stay base to the attachment base has been completed by fastening a screw into the stay base, subsequent to the state in FIG. 7.

FIG. 8B is a vertical sectional view of the stay base and the attachment base in the state in FIG. 8A cut at a cutting position that is the same as the cutting position in FIGS. 5B, 6B and 7B and illustrates a state in which the attachment base is bonded to a surface on the vehicle interior side of a front windshield.

FIG. 8C is a plan view of the stay base and the attachment base in the state in FIG. 8A.

FIG. 8D is a vertical sectional view of the stay base and the attachment base in the state in FIG. 8A cut at a position at which left and right plate spring pieces and the projections (protrusion) are located, along a direction orthogonal to the direction of the sliding-in of the attachment base, the attachment base being bonded to the surface on the vehicle interior side of the front windshield of the vehicle.

DESCRIPTION OF EMBODIMENTS

Embodiments of this invention will be described. Note that in the below description, expressions of directions that are common to a stay base, a plate spring and an attachment base (respective directions of front, rear, up, down, left and right) are used according to the following definitions.

Figure 1:
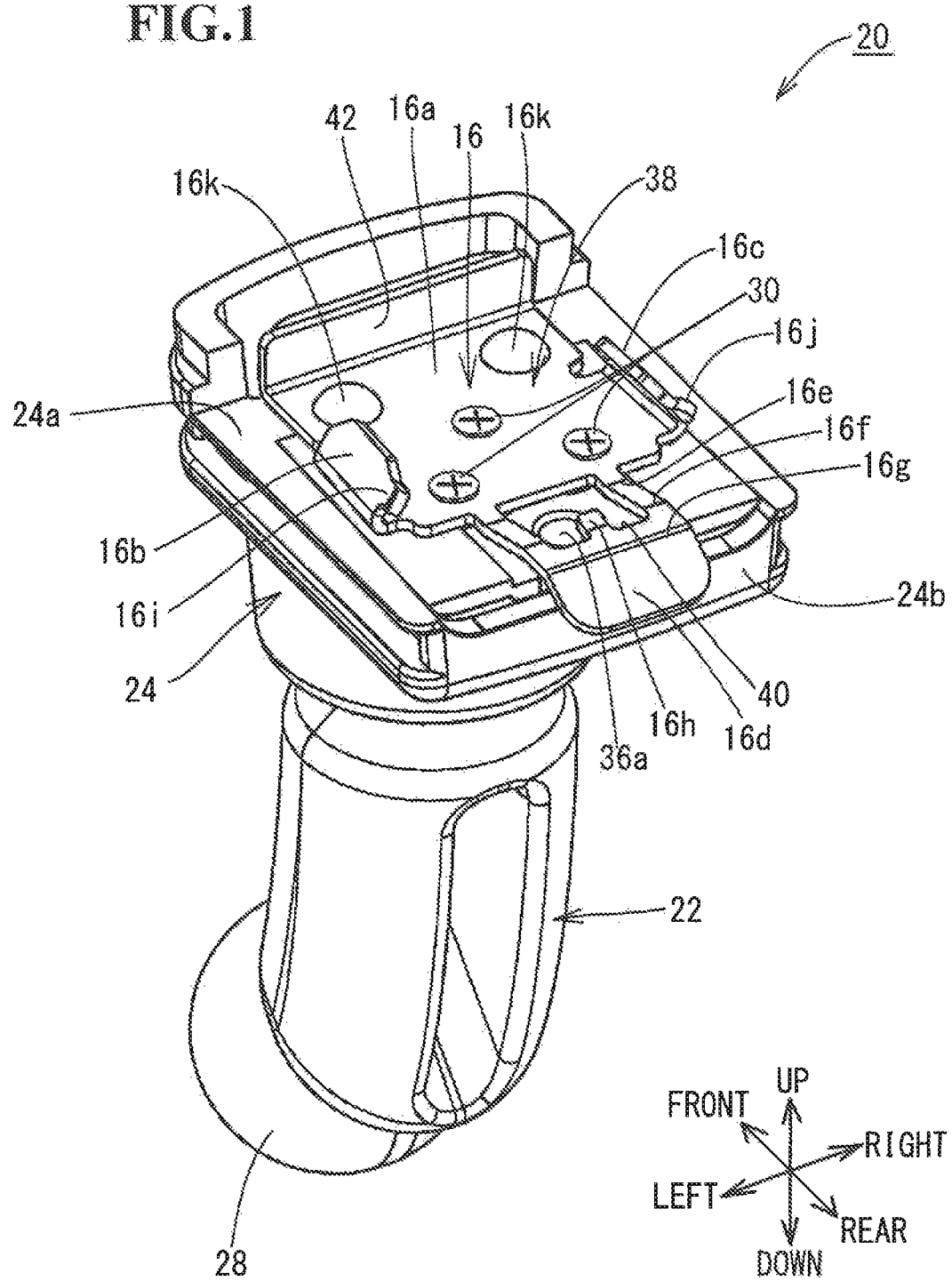
FIG. 1 is a diagram illustrating an embodiment of a drop-off mechanism-equipped attachment structure according to this invention and is a perspective diagram of a stay (an assembled body of a stay body and a stay base, or a support part of an inner mirror) in FIG. 2, with indications of directions that are common to the stay base, a plate spring and an attachment base.

Directions corresponding to these expressions are indicated in FIG. 1. Note that the expressions of directions do not agree with directions of a vehicle body.

"Front": front side in a direction of sliding of an attachment base into a plate spring "Rear": rear side in the direction of sliding of the attachment base into the plate spring "Up": direction from a top surface of a stay base toward a space, the direction being orthogonal to the top surface (direction from a front surface to a back surface (bonding surface) in a thickness direction of the attachment base fitted in the plate spring)

"Down": direction from the top surface of the stay base toward the inside of the stay base, the direction being orthogonal to the top surface (direction from the back surface (bonding surface) to the front surface in the thickness direction of the attachment base fitted in the plate spring)

"Left": Left side as the direction of sliding of the attachment base into the plate spring is viewed as a direction from the rear side to the front side with the top surface of the stay base facing up "Right": Right side as the direction of sliding of the attachment base into the plate spring is viewed as a direction from the rear side to the front side with the top surface of the stay base facing up Embodiment 1

Figure 2:
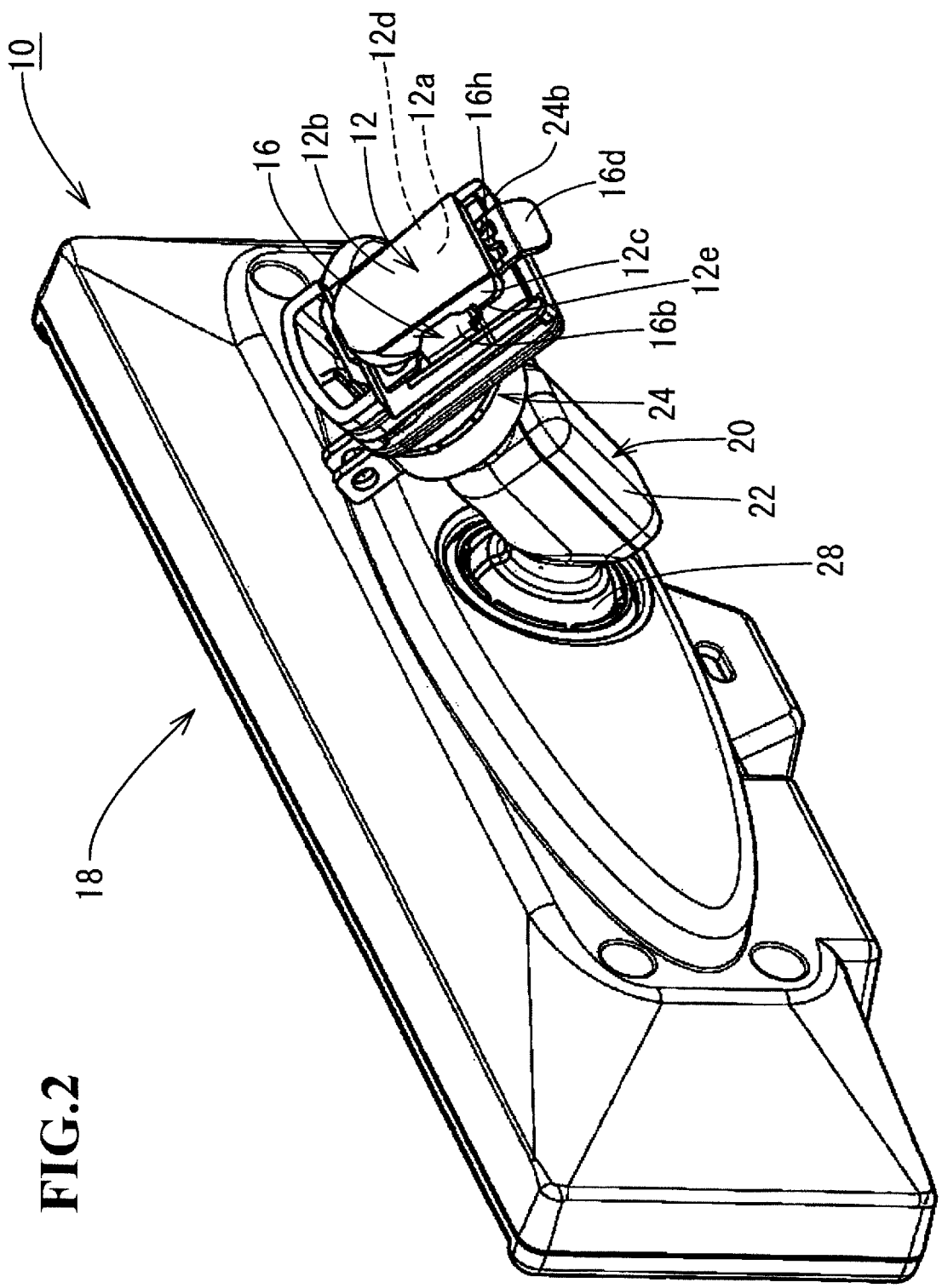
FIG. 2 is a diagram illustrating an embodiment of an inner mirror for a vehicle, the inner mirror including the drop-off mechanism-equipped attachment structure in FIG. 1, and is a perspective diagram of the inner mirror as viewed from the upper back side, the inner mirror being attached to the attachment base.
Figure 8C:
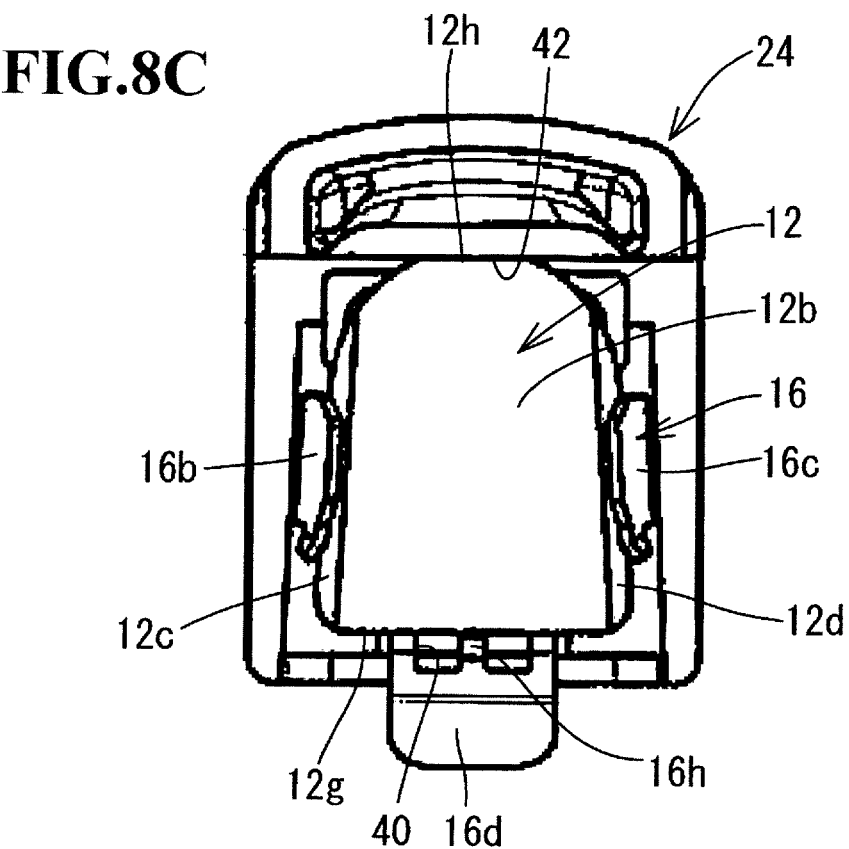
Figure 8D:
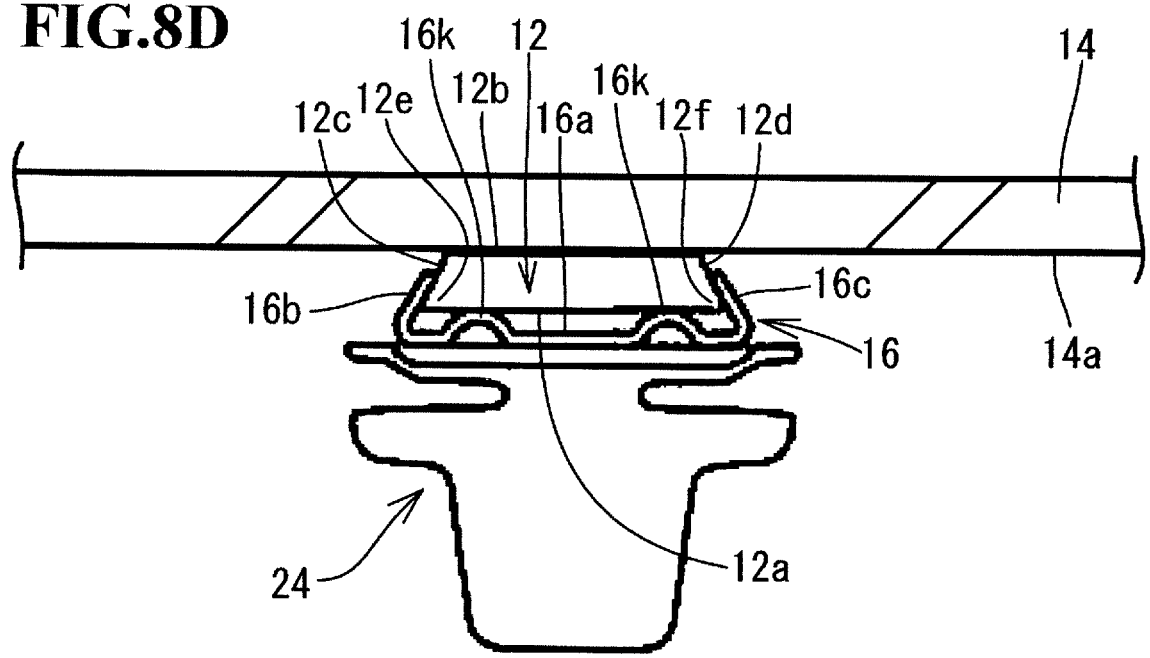

FIG. 2 illustrates an embodiment of an inner mirror for a vehicle, the inner mirror including an attachment structure according to this invention. FIG. 2 illustrates an inner mirror 10 attached to an attachment base 12. The attachment base 12 is what is called a wedge mount button. In other words, the attachment base 12 is formed of a steel block (flat plate) having a thickness of around 5 mm. The attachment base 12 has a tapered, rough home plate-like shape as viewed in a direction orthogonal to a surface of the plate (FIG. 8C). As the attachment base 12 is viewed in the direction orthogonal to the surface of the plate, left and right side surfaces 12c, 12d of the attachment base 12 are formed so as to be non-parallel to each other (that is, a length between the left and right side surfaces 12c, 12d is narrower further on the front side) (FIG. 8C). The attachment base 12 includes a front surface 12a and a back surface 12b, each of which is a substantially flat surface (FIG. 8D). The back surface 12b is a surface bonded to a surface 14a on the vehicle interior side of a front windshield 14 (FIGS. 8B and 8D) and the front surface 12a is a surface facing the vehicle interior side. The attachment base 12 is bonded and fixed to an upper part of a center in a width direction of the surface 14a on the vehicle interior side of the front windshield 14 in a front part of the vehicle interior in such a manner that the tapered side (front side) of the attachment base 12 faces toward the upper side of the vehicle interior. The left and right side surfaces 12c, 12d of the attachment base 12 are surfaces inclined in a thickness direction of the attachment base 12 so as to approach each other from the front surface 12a side to the back surface 12b side (FIG. 8D). Consequently, each of left and right edges 12e, 12f formed between the front surface 12a and left and right side surfaces 12c, 12d, respectively, has an acute angle. Therefore, as described later. left and right plate spring pieces 16b, 16c can be elastically fitted to the left and right side surfaces 12c, 12d of the attachment base 12, respectively (FIG. 8D).

In FIG. 2, the inner mirror 10 includes an inner mirror body 18 (an in-vehicle device body or an in-vehicle viewing device body) and a stay 20 (support part). The inner mirror body 18 is formed of, e.g., a conventional mirror using a reflective mirror or an electronic mirror with an image display device such as a liquid-crystal display incorporated therein (which may be one including both an image display device and a reflective mirror). The inner mirror body 18 is attached to the attachment base 12 via the stay 20.

Figure 3:
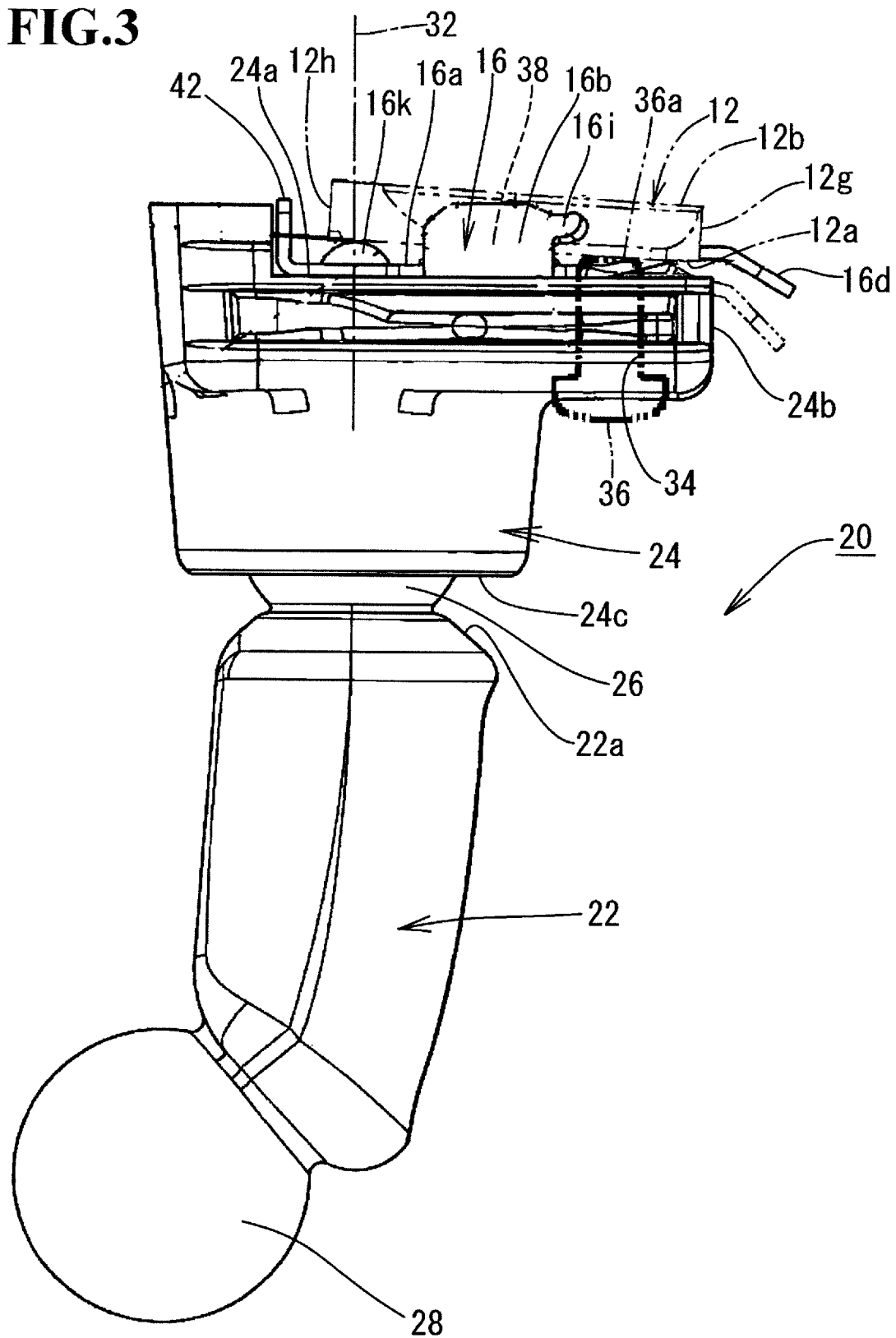
FIG. 3 is a side view of the stay in FIGS. 1 and 2.
Figure 4:
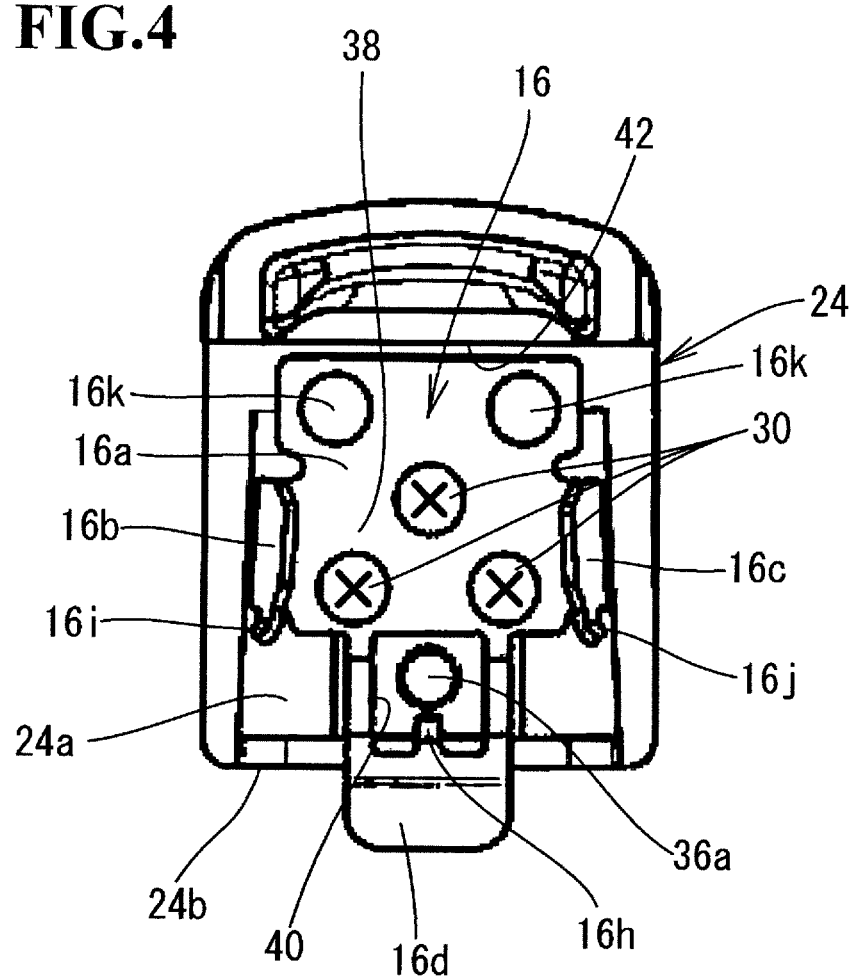
FIG. 4 is a plan view of the stay base in FIGS. 1 and 3.

Respective structures of the stay 20 and the plate spring 16 will be described with reference to FIGS. 1, 3 and 4. The stay 20 includes a stay body 22 (support part body) and a stay base 24 (support part base). Each of the stay body 22 and the stay base 24 is formed of, for example, a single-piece molded product of a reinforced resin such as a PA+GF resin (glass fiber reinforced polyamide resin). Each of the stay body 22 and the stay base 24 can be an insert molded product with a metal member embedded therein for further reinforcement. The stay body 22 is tiltably joined to the stay base 24 via a pivoting connection part 26 (FIG. 3) at an upper end thereof. The pivoting connection part 26 here is formed of a pivot using a ball joint, enabling the stay body 22 to tilt in all directions relative to the stay base 24. A driver can adjust a height of the inner mirror body 18 to a height desired by the driver himself/herself by manually adjusting an angle of tilting of the stay body 22 with the pivoting connection part 26 as a center. The inner mirror body 18 is joined to a pivot 28 formed of a ball joint at a lower end of the stay body 22 so as to be tiltable in all directions (FIG. 2). A plate spring 16 is fixed to a top surface 24a of the stay base 24 via three screws 30 (FIGS. 1 and 4). As illustrated in FIG. 3, an extension part 24b extending in a rearward direction orthogonal to a center axis 32 of the stay base 24 is formed at an upper part of the stay base 24. In the extension part 24b, a screw hole 34 is formed so as to extend therethrough in a plate thickness direction thereof. An axis of the screw hole 34 is disposed in parallel to the center axis 32 of the stay base 24. A steel screw 36 is screwed into the screw hole 34 from the lower side of the extension part 24b. A distal end 36a of the screw 36 (screw distal end) has a non-acute shape and is formed of, for example, a flat surface or a curved protrusion surface. Upon the screw 36 being screwed into the stay base 24, the screw distal end 36a projects upward from the top surface 24a of the stay base 24 and comes into pressure contact with a rear part of the front surface 12a of the attachment base 12 fitted in the plate spring 16 and thereby supports the rear part. If the screw 36 is further fastened against a spring force of the plate spring 16, the pressure is increased and a force of the fitting between the attachment base 12 and the plate spring 16 is thereby increased. The fitting force can be adjusted using the amount of fastening of the screw 36.

The plate spring 16 is formed by machining a single steel plate spring material. As illustrated in FIGS. 1 and 4, the plate spring 16 includes a fixation part 16a, the plate spring left piece 16b, the plate spring right piece 16c and a lug 16d. The fixation part 16a is positioned at a center of a plate surface of the plate spring 16. The fixation part 16a is mounted and supported on the top surface 24a of the stay base 24 and fixed to the stay base 24 via the screws 30. Consequently, the plate spring 16 is fixed to the stay base 24, The left and right plate spring pieces 16b, 16c connect to opposite, left and right, side parts of the fixation part 16a and are flexed obliquely upward relative to the left and right side parts of the fixation part 16a, respectively, so as to be oriented inward. In other words, the left and right plate spring pieces 16b, 16c are inclined so as to conform to the left and right side surfaces 12c, 12d of the attachment base 12, the left and right side surfaces 12c, 12d being inclined in the thickness direction of the attachment base 12. Also, as illustrated in FIG. 4, the left and right plate spring pieces 16b, 16c are disposed in non-parallel to each other so as to conform to the left and right side surfaces 12c, 12d of the attachment base 12, the left and right side surfaces 12c, 12d being in non-parallel to each other as viewed in the direction orthogonal to the plate surface of the attachment base 12. The attachment base 12 slides into and is thereby received in a space 38 interposed between the left and right plate spring pieces 16b, 16c. The left and right plate spring pieces 16b, 16c inclined in an up-down direction engage with the left and right side surfaces 12c, 12d of the attachment base 12, the left and right side surfaces 12c, 12d being inclined in the direction that is the same as the up-down direction (thickness direction), respectively. On the respective rear sides, that is, the respective entrance sides from which the attachment base 12 slides in, of the left and right plate spring pieces 16b, 16c, guide parts 16i, 16j that spread rearward to guide sliding-in of the attachment base 12 are formed.

The lug 16d connects to a rear part of the fixation part 16a. An opening 40 is formed in the lug 16d. The opening 40 allows entry of the screw distal end 36a projecting upward from the top surface 24a of the stay base 24 side. A part on the rear side of the opening 40 is cut and raised to form a hook 16h (cut and raised protrusion hook) in such a manner that the hook 16h is continuous with the lug 16d and projects obliquely upward so as to be oriented forward. When the inner mirror 10 is attached to the attachment base 12, upon the attachment base 12 sliding into the space 38 and reaching a predetermined attachment position (proper attachment position) in the stay base 24, the hook 16h engages with a rear end surface 12g of the attachment base 12 and thereby suppresses backward movement of the attachment base 12. A first flexure 16e that causes the lug 16d to be flexed upward is formed at a boundary between the fixation part 16a and the lug 16d. Consequently, the lug 16d is disposed so as to be spaced (floated) from the top surface 24a of the stay base 24. A second flexure 16f that causes the lug 16d to be flexed again so as to be substantially parallel to the fixation part 16a and a third flexure 16g that causes the lug 16d to be flexed downward are successively formed at respective positions away on the rear side (free end side) from the first flexure 16e in the lug 16d. A part, on the rear side (free end side) relative to the second flexure 16f, of the lug 16d is disposed on the outer side relative to an outer peripheral edge of the top surface 24a of the stay base 24. Consequently, when the lug 16d is pressed down with a finger to detach the hook 16h from the rear end surface 12g of the attachment base 12 in order to remove the inner mirror 10 from the attachment base 12, the lug 16d can be pressed down without being interrupted by the stay base 24. Since the first flexure 16e is formed at a position at which the first flexure 16e faces the opening 40 and thus weak, that is, easily elastically deforms, upon the lug 16*d* being pressed down with a finger, the lug 16*d* is moved downward with the first flexure 16*e* as a center. Consequently, the hook 16*h* can relatively easily be detached from the rear end surface 12*g* of the attachment base 12.

Two mound-like projections 16*k* (protrusion) are formed at respective positions close to the front within a surface of the fixation part 16*a*. These two projections 16*k* abut on and thereby support left and right positions in a front part of the front surface 12*a* of the attachment base 12 fitted in the plate spring 16, respectively.

A sliding stopping part 42 is provided at the stay 20. When the attachment base 12 slides into the space 38 and reaches the predetermined attachment position (proper attachment position) in the stay base 24, the sliding stopping part 42 abuts on a front end surface 12*h* of the attachment base 12 and thereby stops the sliding action of the attachment base 12. With regard to the sliding stopping part 42, different configurations are illustrated in FIGS. 1 and 3 and the figures other than FIGS. 1 and 3. In other words, the sliding stopping part 42 illustrated in FIGS. 1 and 3 is formed by a front end of the plate spring 16 being flexed upward to a right angle. The sliding stopping part 42 illustrated in the figures other than FIGS. 1 and 3 are formed by forming a wall standing perpendicularly from the front part of the top surface 24*a* of the stay base 24 as a part of the structure of the stay base 24. Both the sliding stopping parts 42 operate similarly. In other words, simultaneously or substantially simultaneously with the hook 16*h* engaging with the rear end surface 12*g* of the attachment base 12 after the attachment base 12 sliding into the space 38 and reaching the predetermined attachment position (proper attachment position) in the stay base 24, the front end surface 12*h* of the attachment base 12 abuts on the sliding stopping part 42. Consequently, the sliding stopping part 42 stops the sliding action of the attachment base 12.

A procedure for manually attaching the inner mirror 10 (FIG. 2) having the above-described configuration to a surface 14*a* on the vehicle interior side of a front windshield 14 (FIGS. 8B and 8D) of a vehicle via the attachment base 12 will be described with reference to FIGS. 5 to 8.

(1) The attachment base is bonded and fixed to an upper part of a center in a width direction of the surface 14*a* on the vehicle interior side of the front windshield 14 of the vehicle (FIGS. 8B and 8D).

(2) The inner mirror 10 with the stay 20 attached thereto is prepared. The plate spring 16 is attached to the top surface 24*a* of the stay base 24 of the stay 20.

Figure 5A:
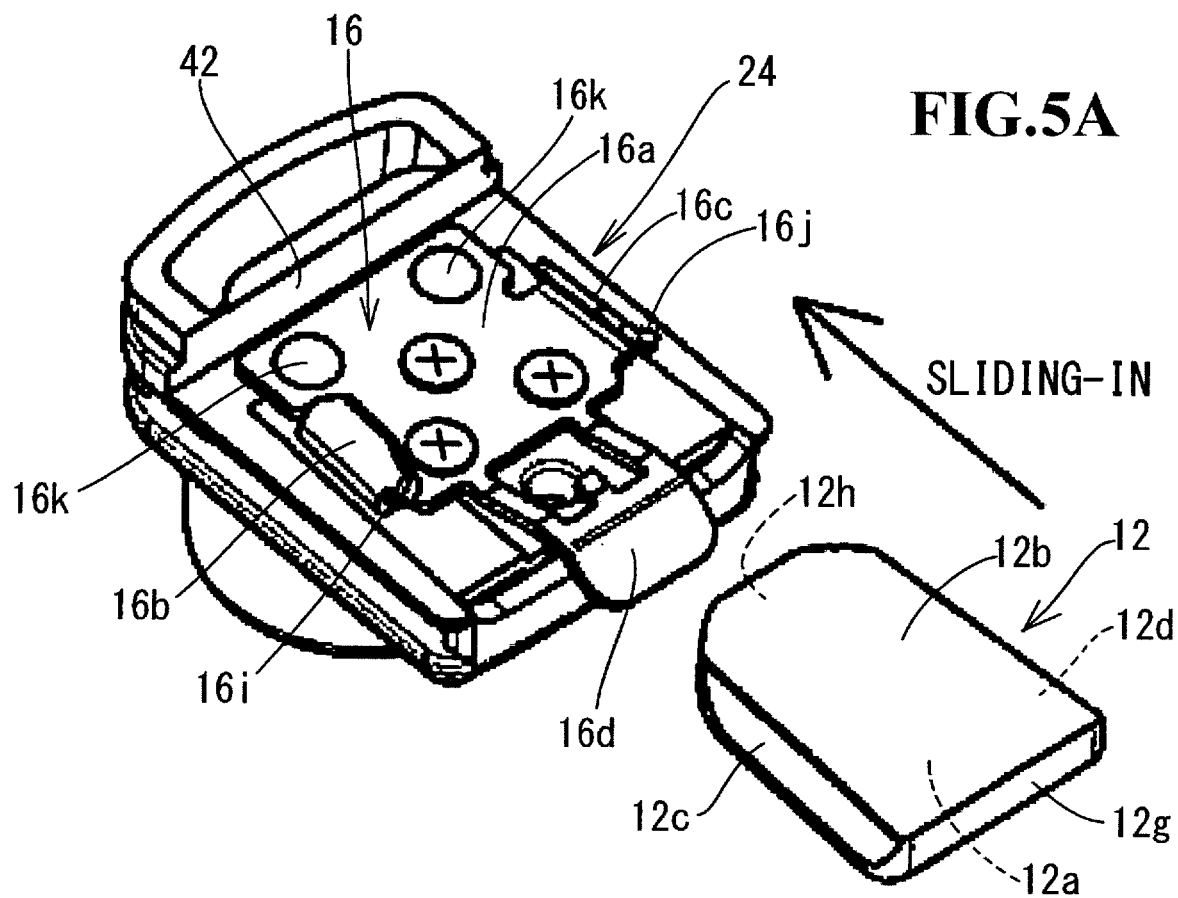
Figure 5B:
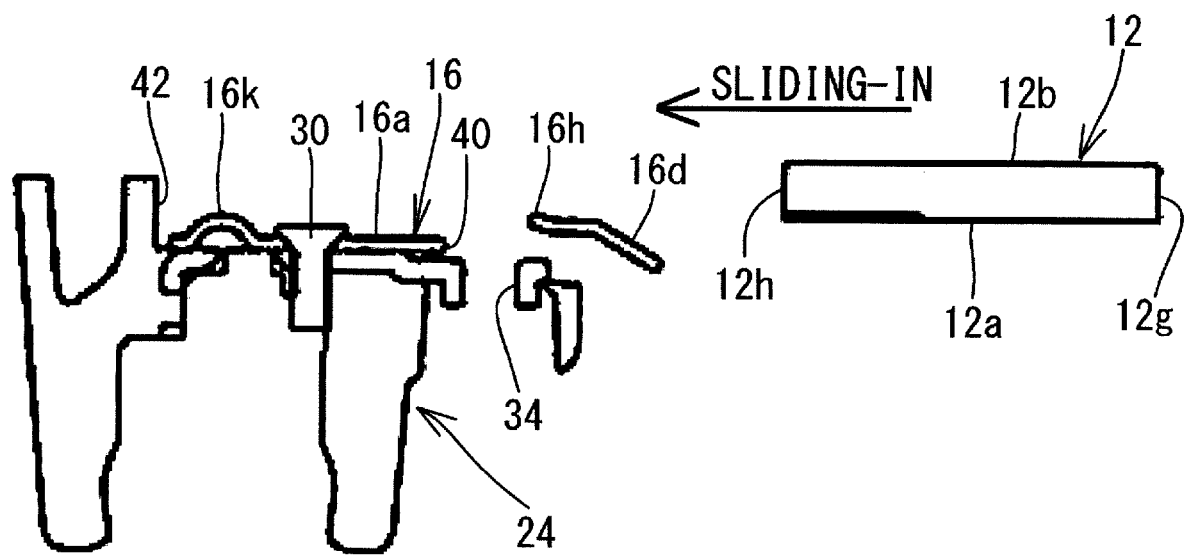

(3) FIG. 5 illustrates a state immediately before sliding of the attachment base 12 into the plate spring 16 of the stay base 24. From this state, the attachment base 12 is slid into the space 38 interposed between the left and right plate spring pieces 16*b*, 16*c*. Since the attachment base 12 is fixed to the front windshield 14 of the vehicle, in reality, the sliding-in is performed by moving the inner mirror 10 to the fixed attachment base 12 in a direction opposite to the sliding-in direction of the attachment base 12. In other words, the inner mirror 10 is moved from the upper side toward the lower side of the vehicle interior along the front windshield 14.

(4) Upon the attachment base 12 being slid into the space 38, the left and right side surfaces 12*c*, 12*d* inclined in the thickness direction of the attachment base 12 and the left and right plate spring pieces 16*b*, 16*c* inclined in the direction that is the same as the left and right side surfaces 12*c*, 12*d* are loosely fitted together. Consequently, the attachment base 12 is prevented from movement in respective directions along a surface orthogonal to the sliding-in direction (all directions of up, down, left and right) and is movable only in the sliding direction along the surface of the attachment base 12. Until the attachment base 12 reaches the projections 16*k*, the attachment base 12 can slide in with no substantial resistance. Upon the state in FIG. 6 in which a lower end corner of the front end surface 12*h* of the attachment base 12 abuts on the projections 16*k* being reached, the sliding-in is temporarily stopped.

Figure 6A:
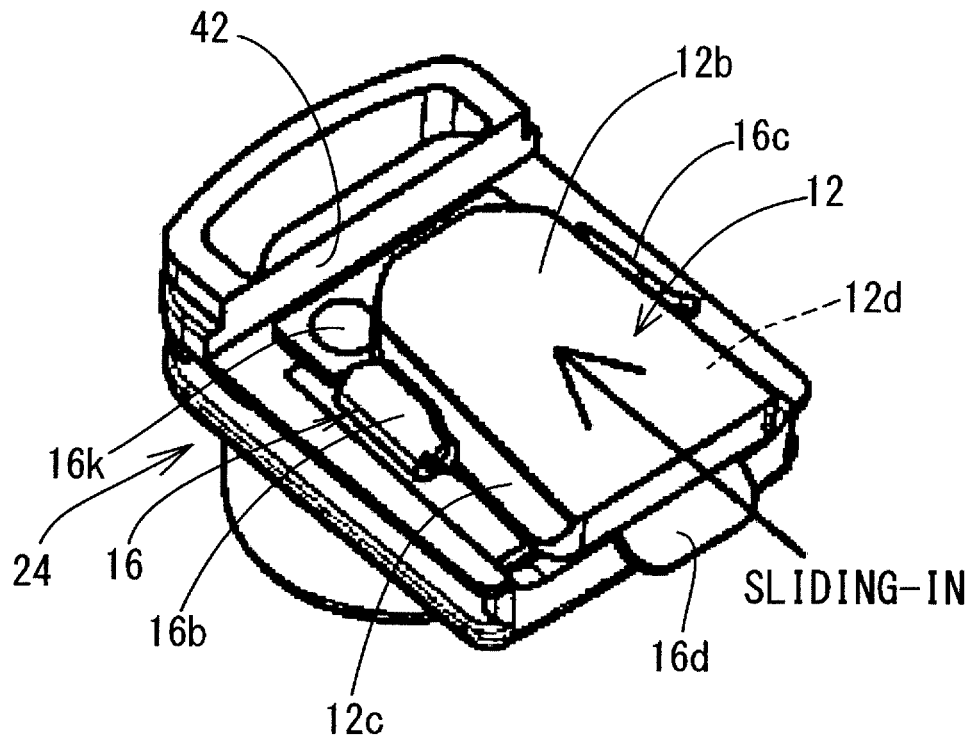
FIG. 6A is a perspective diagram illustrating a state in the middle of the sliding of the attachment base into the stay base subsequent to the state in FIG. 5. The state in the middle is a state when a lower end corner of a front end surface of the attachment base abuts on projections (protrusions).
Figure 6B:
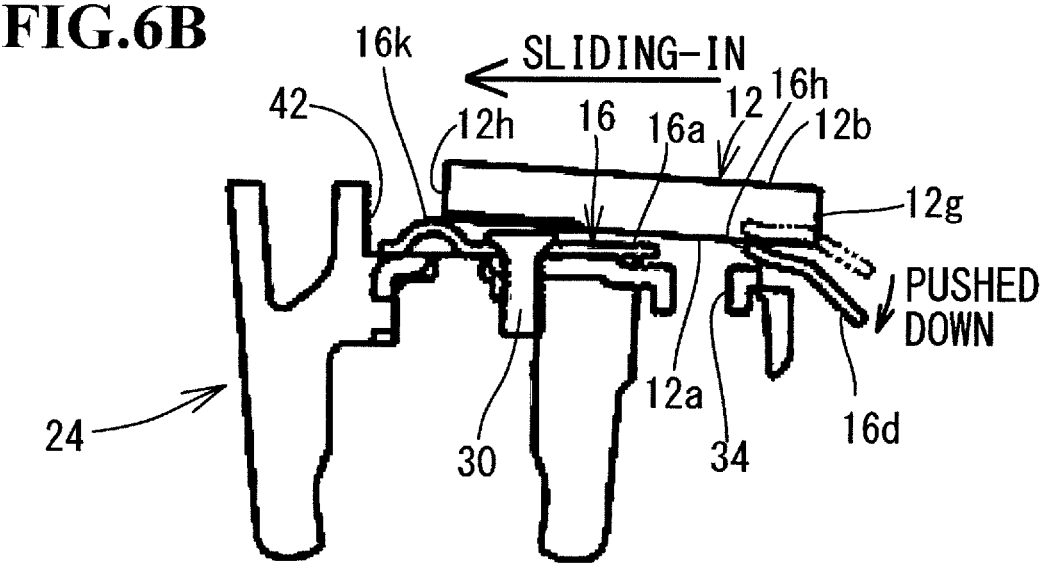
FIG. 6B is a vertical sectional view of the stay base and the attachment base in the state in FIG. 6A cut at a position that is same as the cutting position in FIG. 5B.
Figure 7A:
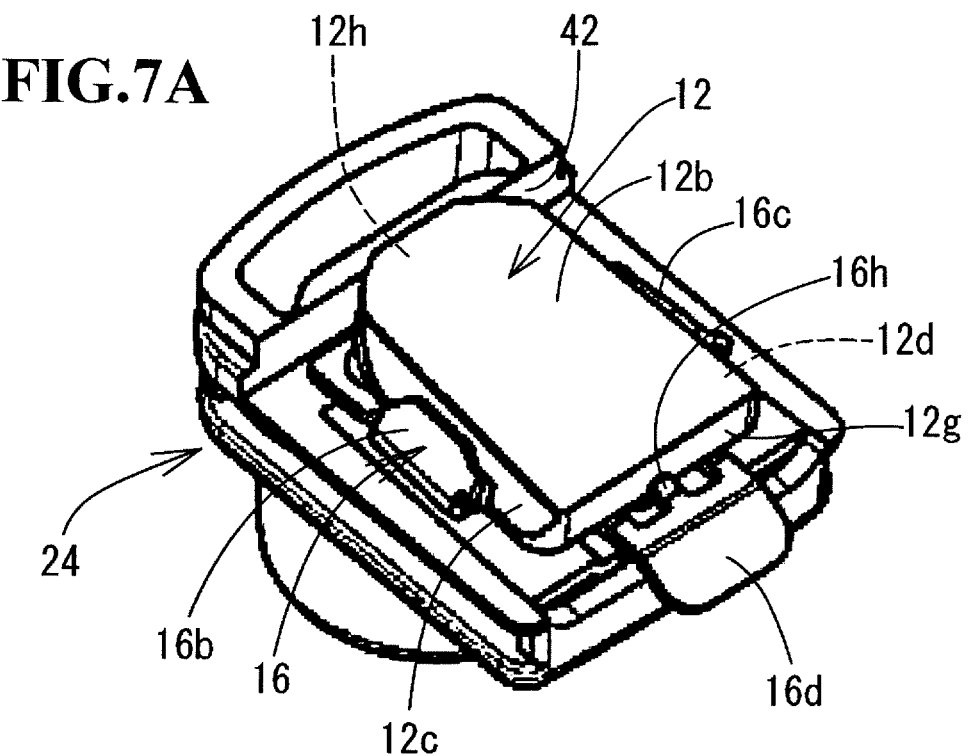
FIG. 7A is a perspective diagram illustrating a state in which the attachment base reaches a predetermined attachment position (that is, a proper attachment position) in the stay base and the sliding is thus stopped, subsequent to the state in FIG. 6.
Figure 7B:
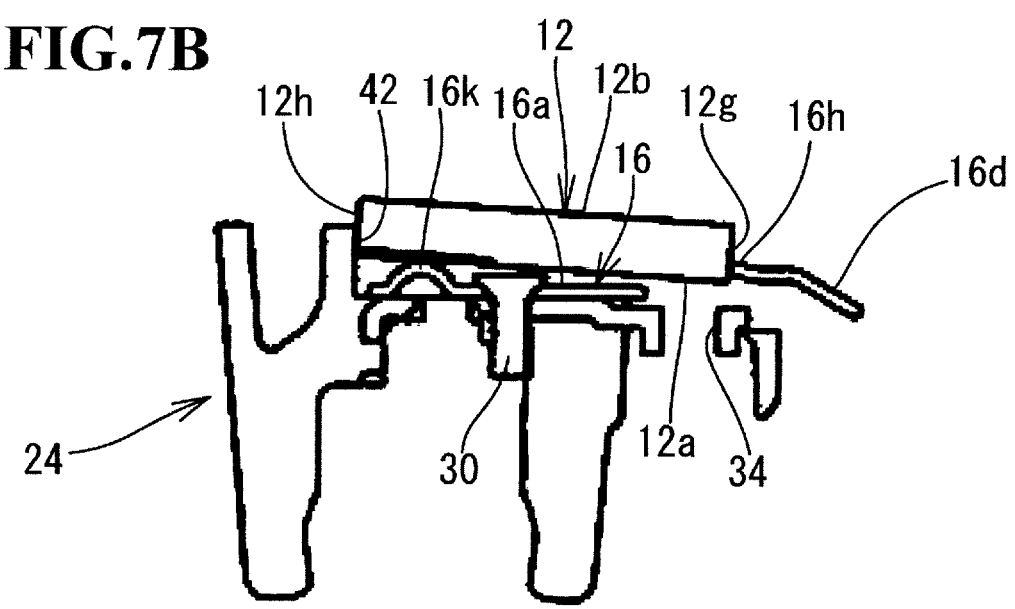
FIG. 7B is a vertical sectional view of the stay base and the attachment base in the state in FIG. 7A cut at a cutting position that is the same as the cutting position in FIGS. 5B and 6B.

(5) Upon the attachment base 12 being further slid in with a little more force, the lower end corner of the front end surface 12*h* of the attachment base 12 climbs up the projections 16*k* from the state in FIG. 6. Along with this, a force of fitting the left and right plate spring pieces 16*b*, 16*c* to the left and right side surfaces 12*c*, 12*d* is increased, and the front surface 12*a* of the attachment base 12 comes into pressure contact with the hook 16*h* and presses the lug 16*d* down, whereby the first flexure 16*e* elastically deforms. However, at this point of time, fastening of the screw 36 (FIG. 3) is still not performed, and thus, the attachment base 12 is relatively easily further slid into the space 38 although the sliding resistance is somewhat increased. At the time of the sliding-in, a part of the front surface 12*a*, the part being close to the front, slides on respective tops of the projections 16*k*, a part of the front surface 12*a*, the part being close to the rear, slides on the hook 16*h*, and the left and right side surfaces 12*c*, 12*d* slide on respective inner periphery surfaces of the left and right plate spring pieces 16*b*, 16*c*. Subsequently, upon the attachment base 12 climbing over the hook 16*h*, the hook 16*h* engages with the rear end surface 12*g* of the attachment base 12. Concurrently, the front end surface 12*h* of the attachment base 12 abuts on the sliding stopping part 42 and is thereby locked and the sliding-in is thus stopped. When the attachment base 12 climbs over the hook 16*h* and the hook 16*h* engages with the rear end surface 12*g* of the attachment base 12, a person who performs the attachment work feels a click and thus can easily perceive that the attachment base 12 has reached the predetermined attachment position. FIGS. 7A and 7B illustrate a state in which the attachment base 12 has been disposed at the predetermined attachment position (proper attachment position) in the stay base 24 as a result of the stoppage of the sliding-in, thus, an end of the sliding-in action.

(6) The screw 36 is inserted to the screw hole 34 from the lower side of the stay base 24 and the screw 36 is screwed into the screw hole 34 with a tool (FIG. 8B). In performing this work, the stay body 22 is largely tilted to the vehicle rear side (the left side in FIG. 3) with the pivoting connection part 26 in FIG. 3 as a center, enabling preventing the stay body 22 from interrupting the handling of the screw 36. The screw distal end 36*a* abuts on the front surface 12*a* of the attachment base 12 through the opening 40 of the plate spring 16. Upon the screw 36 being further fastened against the spring force of the plate spring 16, the screw distal end 36*a* pushes the attachment base 12 upward (in reality, the stay base 24 is lowered relative to the fixed attachment base 12). Consequently, the force of fitting the left and right plate spring pieces 16*b*, 16*c* to the left and right side surfaces 12*c*, 12*d* is increased. When the fitting force reaches a predetermined magnitude, the fastening of the screw 36 is terminated. In this way, the left and right plate spring pieces 16*b*, 16*c* are elastically fitted to the left and right side surfaces 12*c*, 12*d* of the attachment base 12, and as a result, the stay base 24 is fixed to the attachment base 12 with no backlash. The magnitude of the force of the elastic fitting can be adjusted according to the weight of the inner mirror 10. In other words, if the weight of the inner mirror 10 is large, the amount of fastening the screw 36 is increased in comparison with a case where the weight is small. According to this, the fitting force is increased and thus a strength of attachment of the inner mirror 10 to the attachment base 12 is increased. Consequently, even if the inner mirror 10 is an electronic mirror or a large-size inner mirror, which is heavy, the inner mirror 10 can firmly be supported on the attachment base 12, enabling less occurrence of backlash of the inner mirror 10 during use of the vehicle after the attachment. Also, the attachment is performed using the force of fitting between the attachment base 12 and the plate spring 16, eliminating the need to cause the screw distal end 36a to dig into the attachment base 12. Therefore, the screw distal end 36a has a non-acute shape (that is, a flat surface, a curved protrusion surface or the like), enabling suppression of backlash due to abrasion of the screw distal end 36a and the attachment base 12. In such a manner as described above, the stay base 24 is firmly fixed to the attachment base 12 and the attachment is finished. FIGS. 8A and 8B illustrate the state when the attachment is finished. Subsequently, a decorative cover (not illustrated) is fitted to the stay base 24. Note that there is no problem in that even if the stay base 24 is pushed upward by fastening of the screw 36 and the hook 16h is thereby disengaged from the attachment base 12. One reason of the above is that at the point of time of the disengagement, the force of fitting between the left and right side surfaces 12c, 12d of the attachment base 12 and the left and right plate spring pieces 16b, 16c have been increased and thus prevents the attachment base 12 from sliding relative to the plate spring 16. Also, another reason is that when the inner mirror 10 is attached to the front windshield 14, the weight of the inner mirror 10 is imposed in a direction of assembling of the attachment base 12 and the plate spring 16 (that is, the sliding-in direction). Therefore, even if the hook 16h is disengaged from the attachment base 12 at the point of time of the end of the attachment, the inner mirror 10 does not come off from the attachment base 12 during normal running of the vehicle.

Figure 9:
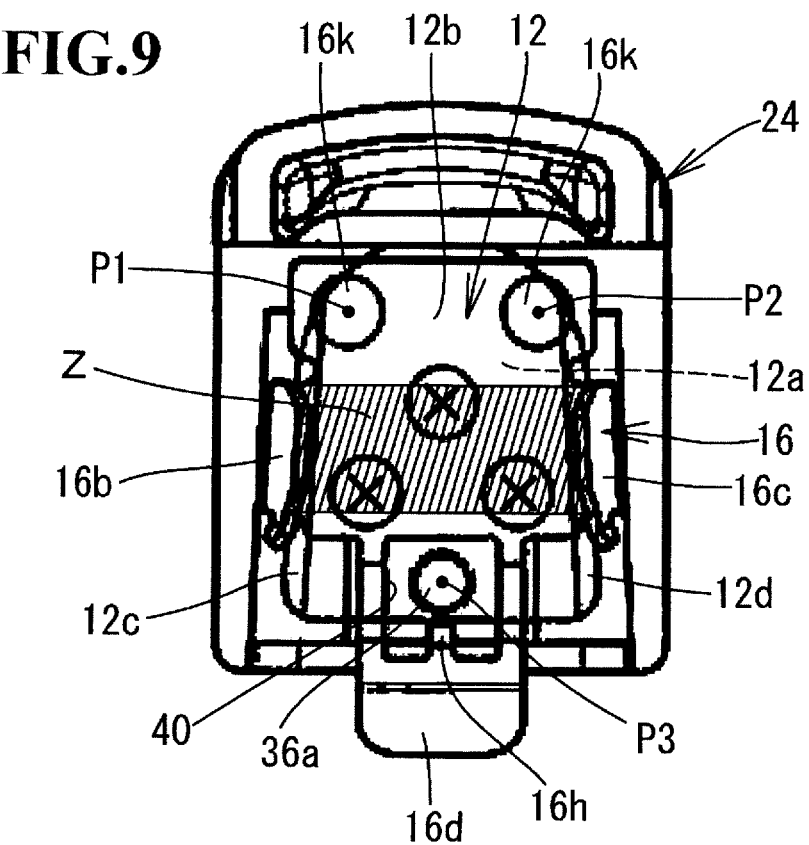
FIG. 9 is a diagram indicating a positional relationship between positions of support of a front surface of the attachment base and a position of fitting of the attachment base in a plate spring in the state in FIG. 8 in which the attachment of the stay base to the attachment base has been completed, which corresponds to the state as seen through the attachment base in FIG. 8C.

A positional relationship between positions of support of the attachment base 12 and a position of fitting of the attachment base 12 in the state in FIGS. 8A to 8D in which the attachment of the stay base 24 to the attachment base 12 has been completed will be described with reference to FIG. 9. Here, the positions of support of the attachment base 12 are positions of support of the front surface 12a of the attachment base 12 by the two projections 16k, 16k and the screw distal end 36a. Also, the positions of fitting to the attachment base 12 are positions of fitting of the left and right plate spring pieces 16b, 16c to the left and right side surfaces 12c, 12d of the attachment base 12. FIG. 9 corresponds to the state in FIG. 8C as seen through the attachment base 12. P1, P2 denote respective positions of support of the front surface 12a of the attachment base 12 by the two projections 16k, 16k and P3 denotes a position of support of the front surface 12a of the attachment base 12 by the screw distal end 36a. Also, Z denotes a region in which the left and right plate spring pieces 16b, 16c face each other, the region being hatched. A direction in which the support positions P1, P2 and the support position P3 are aligned, that is, a direction in which the support positions P1, P2 and the support position P3 face each other (that is, a front-rear direction of the vehicle) and a direction in which the left and right plate spring pieces 16b, 16c face each other (that is, a left-right direction of the vehicle) intersect with each other. Also, the support positions P1, P2 and the support position P3 are disposed at respective positions on opposite outer sides of the region Z with the region Z interposed therebetween. This positional relationship enables the plate spring 16 to be fitted to the attachment base 12 in such a manner that the attachment base 12 is supported stably. In particular, according to this embodiment, the front surface 12a of the attachment base 12 is supported via three points, P1, P2 and P3, enabling provision of particularly stable support.

An operation of removing the inner mirror 10 from the attachment base 12 for a purpose such as repair or replacement of the inner mirror 10, from the state in FIGS. 8A to 8D in which the inner mirror 10 is attached to the attachment base 12 can be performed according to the following procedure.

(1) The non-illustrated cover is removed from the stay base 24.

(2) The screw 36 is rotated and loosen with a tool and the screw distal end 36a is separated off from the front surface 12a of the attachment base 12. Consequently, the force of fitting of the plate spring 16 to the attachment base 12 is decreased. When this work is performed, the stay body 22 is largely tilted to the rear side (left side in FIG. 3) of the vehicle with the pivoting connection part 26 in FIG. 3 as a center, enabling preventing the stay body 22 from interrupting the handling of the screw 36.

(3) While the lug 16d is pressed with a finger of one hand to cause the first flexure 16e (FIG. 1) to elastically deform and thereby disengage the hook 16h from the attachment base 12, the inner mirror body 18 is grasped and pulled upward with the other hand. Consequently, the inner mirror 10 is removed from the attachment base 12.

An avoidance action of the inner mirror 10 when a shock is applied to the inner mirror 10 in the state in FIG. 8 in which the inner mirror 10 is attached to the attachment base 12 is performed as follows. Upon application of an external force to the inner mirror 10 as a result of, e.g., an occupant colliding with the inner mirror body 18, in FIG. 3, first, the stay body 22 pivots with the pivoting connection part 26 as a center to allow the external force to escape (first-step avoidance action). If the provision of the external force is continued and an upper inclined surface 22a (pivoting stopped part) of the stay body 22 abuts on a lower surface 24c (pivoting stopping part) of the stay base 24, the pivoting of the stay body 22 is mechanically stopped. If an external force having a value that is equal to or exceeds a predetermined value is further applied to the inner mirror 10 from this state, the fitting between the attachment base 12 and the plate spring 16 is cancelled (at this time, elastic fracture occurs in the plate spring 16) and the inner mirror 10 drops off from the attachment base 12, together with the stay 20 (second-step avoidance action). Consequently, safety of the occupant is ensured.

Note that as modes of action of the inner mirror 10 dropping off from the attachment base 12 together with the stay 20, there are "rotational drop-off" and "sliding drop-off" depending on the direction of the external force applied to the inner mirror body 18. Rotational drop-off is an action of the stay 20 rotating with an arbitrary support position at which the stay 20 is supported on the attachment base 12, as a point of support, so that the other support position side of the stay 20 is removed from the attachment base 12 (that is, the other support position side is moved away from the front windshield 14) (at this time, elastic fracture occurs in the plate spring 16) and the stay 20 thereby dropping off from the attachment base 12. Sliding drop-off is an action of the stay 20 sliding obliquely downward on the vehicle front side along an inclination of the front windshield 14 so that the attachment base 12 is forcibly further slid in the sliding-in direction (at this time, elastic fracture occurs in the plate spring 16) and the stay 20 thereby dropping off from the attachment base 12. The drop-off mechanism-equipped attachment structure according to the above embodiment can cause either of the drop-off actions that are rotational drop-off and sliding drop-off.

Figure 10:
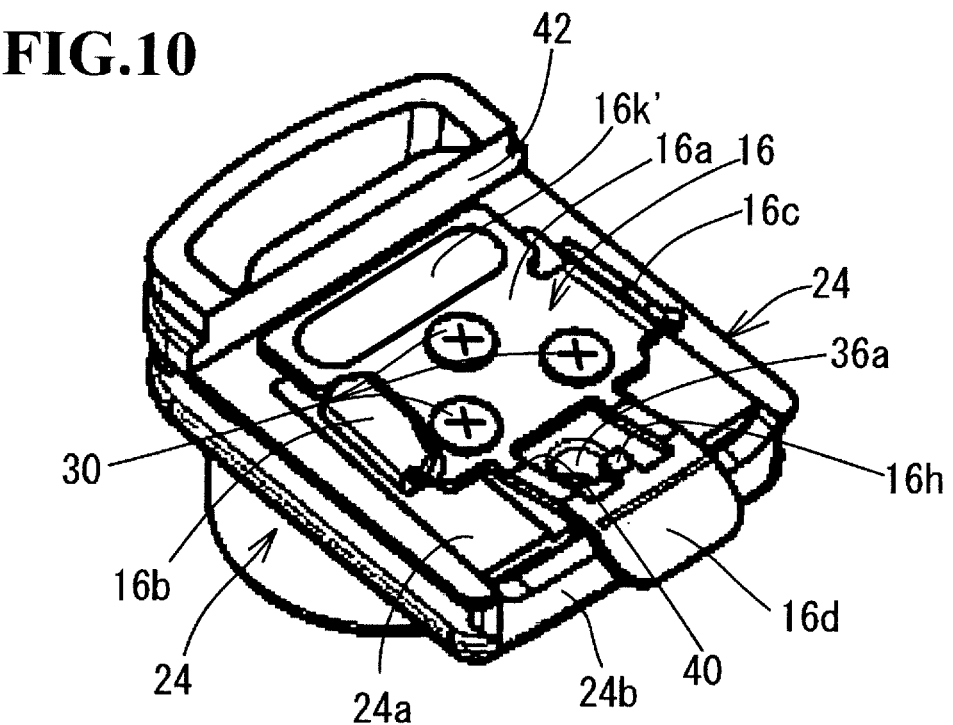
FIG. 10 is a perspective diagram of a stay base indicating an alteration of the protrusion.

Although in Embodiment 1 described above, the protrusion is formed of two projections 16k, 16k aligned in a direction parallel to the direction in which the left and right plate spring pieces 16b, 16c face each other, the configuration and arrangement of the protrusion are not limited to this example. For example, as illustrated in FIG. 10, a protrusion can be formed of a single ridge 16k' extending in a direction parallel to a direction in which left and right plate spring pieces 16b, 16c face each other. Also, although in Embodiment 1 described above, the protrusion is formed at the plate spring 16, the protrusion is not limited to this example. For example, a protrusion can be formed at a top surface 24a of a stay base 24 itself.

Embodiment 2

In the above-described embodiment (Embodiment 1), the pivoting connection part 26 pivotally connecting the stay body 22 to the stay base 24 is formed of a pivot using a ball joint (see FIG. 3), the structure of the pivoting connection part is not limited to this example. For example, the pivoting connection part can be formed of a pivot having a single pivot axis extending in a left-right direction. An inner mirror for a vehicle according to another embodiment (Embodiment 2) including a pivoting connection part configured in such manner will be described. Note that the drop-off mechanism-equipped attachment structure in Embodiment 2 has a structure that is the same as that of Embodiment 1 except the structure of the pivoting connection part. Therefore, the attachment structure in Embodiment 2 is configured so as to be attached to an attachment base 12 that is the same as that described in Embodiment 1. In Embodiment 2, for parts that are in common with Embodiment 1, respective reference numerals used for those of Embodiment 1 are used. Therefore, in Embodiment 2, description of the parts that are common with Embodiment 1 will be omitted.

Figure 11A:
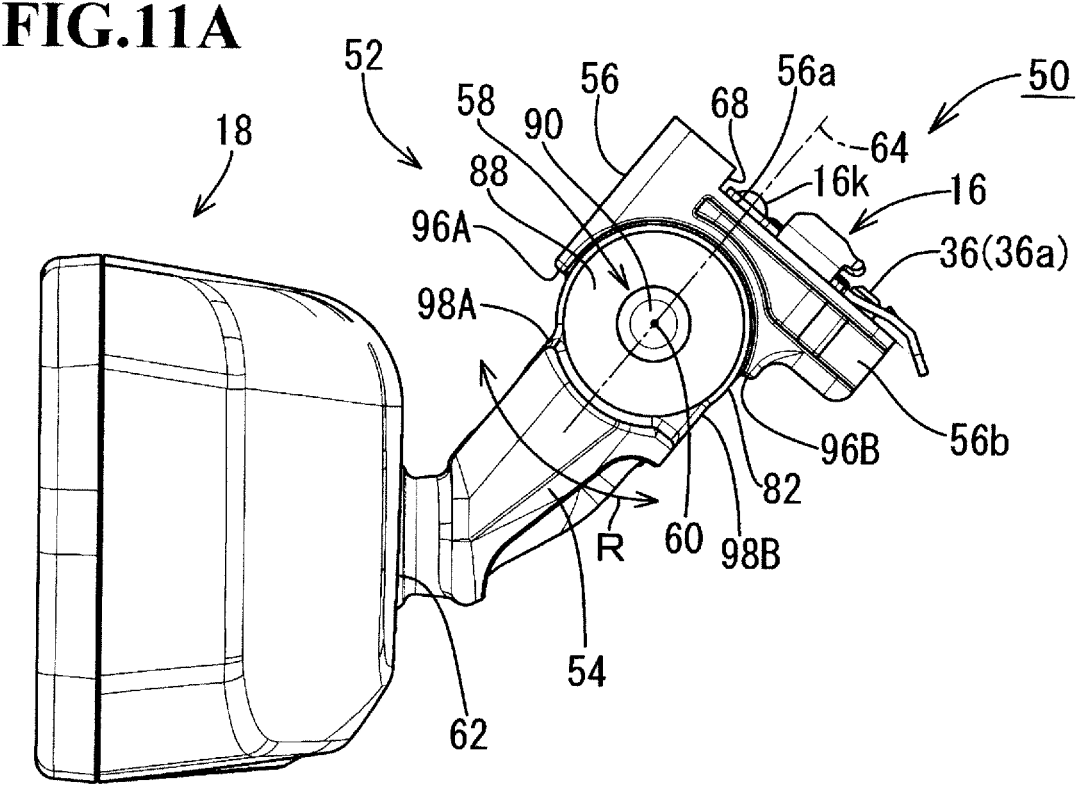
FIG. 11A is a right side view illustrating another embodiment of an inner mirror for a vehicle, the inner mirror including a drop-off mechanism-equipped attachment structure according to this invention, in a position in which the inner mirror is mounted in a vehicle (neither an attachment base nor a screw for fitting illustrated).
Figure 11B:
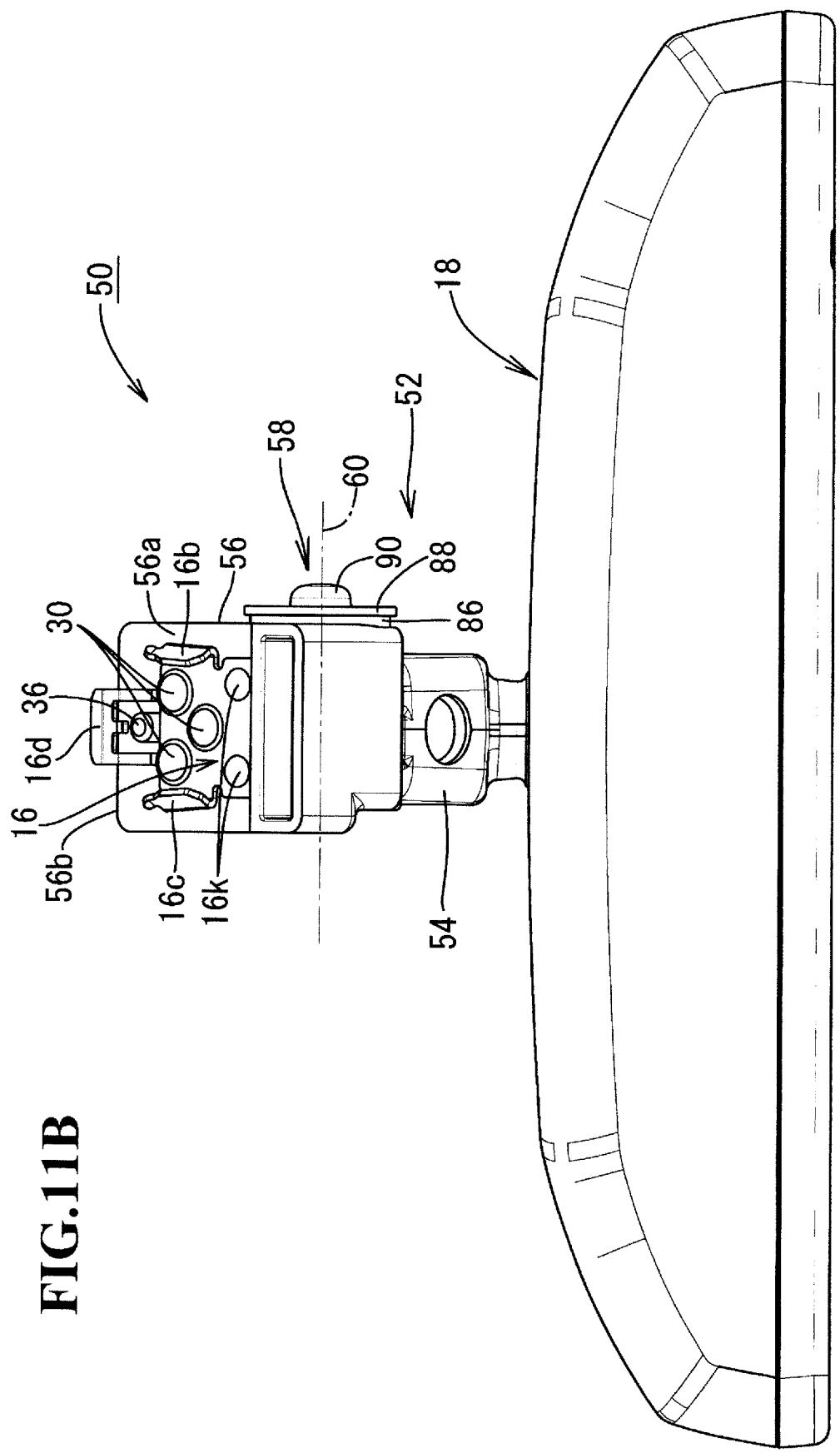
FIG. 11B is a plan view of the inner mirror for a vehicle in FIG. 11A.
Figure 11C:
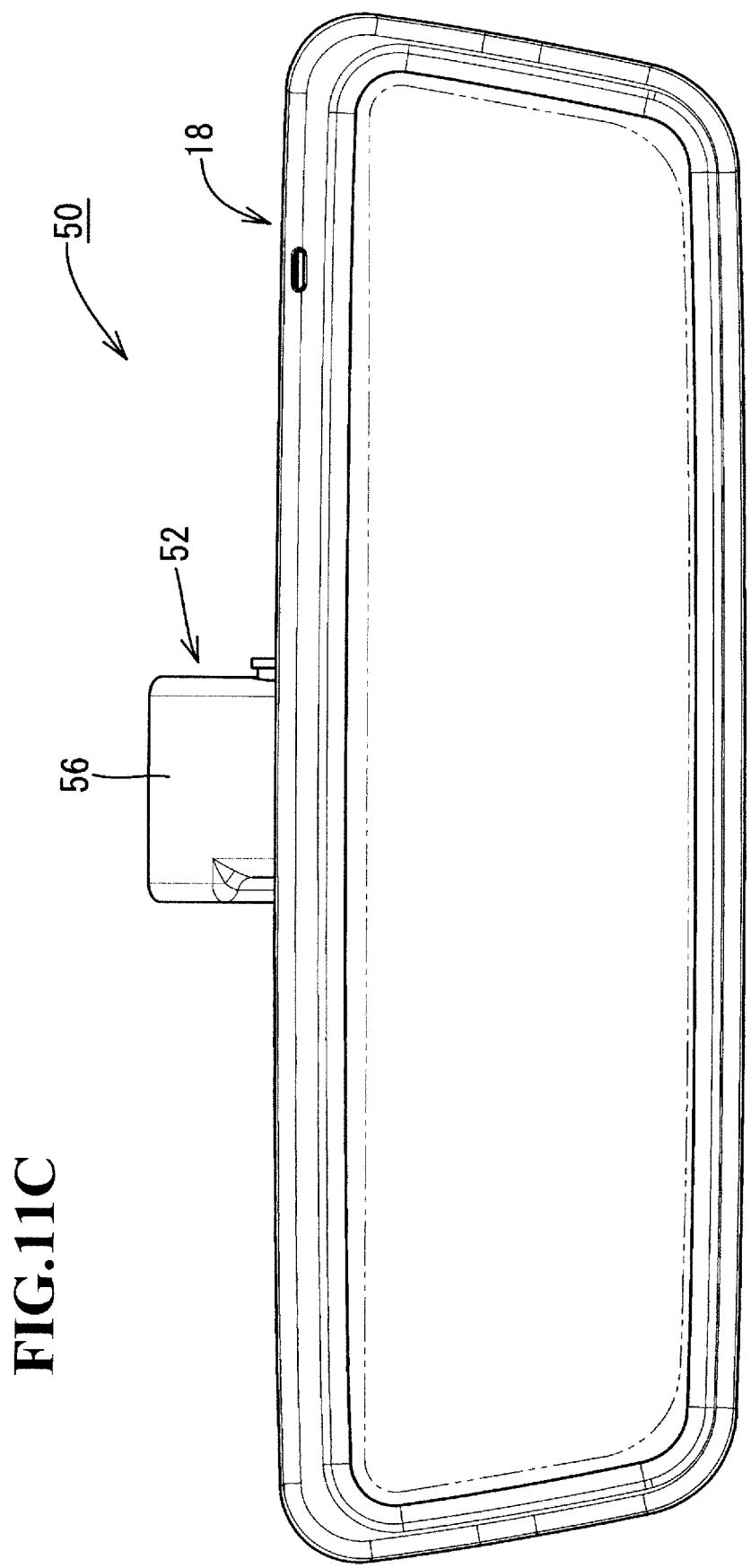
FIG. 11C is a front view of the inner mirror for a vehicle in FIG. 11A.

In FIGS. 11A to 11C, an inner mirror 50 includes an inner mirror body 18 (an in-vehicle device body or an in-vehicle viewing device body) and a stay 52 (support part). The inner mirror body 18 is attached to an attachment base 12 (FIG. 14) via the stay 52. The stay 52 includes a stay body 54 (support part body) and a stay base 56 (support part base). Each of the stay body 54 and the stay base 56 is formed of, for example, a single-piece cast product or a single-piece carved product of a metal such as aluminum or steel or a single-piece molded product of a resin such as PA+GF resin. If each of the stay body 54 and the stay base 56 is formed of a single-piece molded product of a reinforced resin, each of the stay body 54 and the stay base 56 can be formed as an insert molded product with a metal member embedded therein for further reinforcement. An upper end of the stay body 54 is pivotally joined to the stay base 56 via a pivoting connection part 58. Consequently, the stay body 54 is tiltably supported by the stay base 56. In this embodiment, the pivoting connection part 58 is formed of a pivot having a single pivot axis 60. The pivot axis 60 is a pivot axis 60 extending in a direction horizontal to a left-right direction of the vehicle in a state in which the inner mirror 50 is attached to the attachment base 12. The pivoting connection part 58 joins the stay body 54 to the stay base 56 via the pivot axis 60 in such a manner that the stay body 54 can be tilted in a front-rear direction of the vehicle and cannot be tilted in the left-right direction of the vehicle. In FIG. 11A, the tilting direction is indicated by arrow R. A driver can adjust a height of the inner mirror body 18 to a height desired by the driver by manually adjusting an angle of tilting in the vehicle rear-front direction of the stay body 54 with the pivot axis 60 as a center. The inner mirror body 18 is joined to a pivot 62 at a lower end of the stay body 54 in such a manner that the inner mirror body 18 can be tilted in all directions. The pivot 62 is formed of a ball joint. Therefore, the driver can adjust an angle of a mirror surface of the inner mirror body 18 in all directions. A plate spring 16 is fixed to a top surface 56a of the stay base 56 via three screws 30. The plate spring 16 is one that is the same as the plate spring 16 in Embodiment 1. An extension part 56b extending in a rearward direction orthogonal to a center axis 64 of the stay base 56 is formed at an upper part of the stay base 56. Here, the center axis 64 of the stay base 56 is an axis that is orthogonal to the top surface 56a of the stay base 56 and extends through a center position in a width direction (left-right direction) of the stay base 56 and the pivot axis 60. A screw hole 66 (FIG. 14) is formed so as to extend through the extension part 56b in a plate thickness direction of the extension part 56b. An axis of the screw hole 66 is disposed in parallel to the center axis 64 of the stay base 56. A steel screw 36 is screwed into the screw hole 66 from the lower side of the extension part 56b. The screw 36 is one that is the same as the screw 36 in Embodiment 1. Upon the screw 36 being screwed into the stay base 56, a screw distal end 36a projects upward from the top surface 56a of the stay base 56. The top surface 56a is brought into pressure abutment with a rear part of a front surface 12a of the attachment base 12 (FIG. 14) fitted to the plate spring 16 and thereby supports the rear part. If the screw 36 is further fastened against a spring force of the plate spring 16, the pressure is increased and a force of the fitting between the attachment base 12 and the plate spring 16 is thereby increased. The fitting force can be adjusted using the amount of fastening of the screw 36. A sliding stopping part 68 is formed at the top surface 56a of the stay base 56. The sliding stopping part 68 is formed of a wall raised one step from the top surface 56a. The sliding stopping part 68 is disposed at a position on the downstream side of the top surface 56a in a direction in which the attachment base 12 slides in. When attaching the inner mirror 50 to the attachment base 12, the sliding stopping part 68 abuts on a front end surface 12h (FIG. 14) of the attachment base 12 that is sliding in and thereby stops the sliding action of the attachment base 12.

Figure 12:
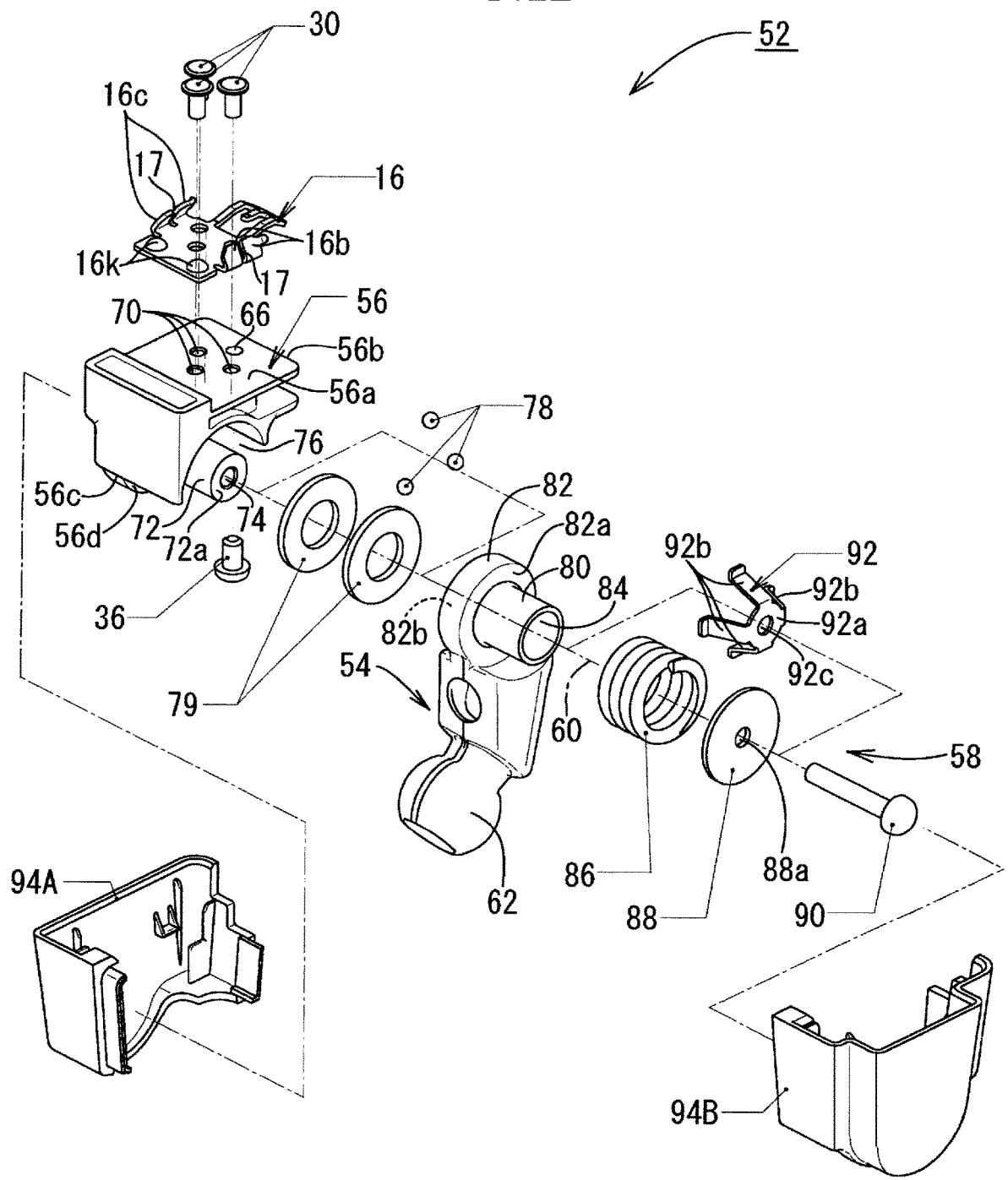
FIG. 12 is an exploded perspective view of the stay in FIGS. 11A to 11C, the stay being broken down into components.

Components of the stay 52 in FIGS. 11A to 11C will be described with reference to FIG. 12. Note that a structure of left and right plate spring pieces 16b, 16c of the plate spring 16 in FIG. 12 is somewhat different from that illustrated in FIGS. 11A and 11B. In other words, a cutout 17 is formed at an intermediate position in the direction in which the attachment base 12 slides in, in each of the left and right plate spring pieces 16b, 16c in FIG. 12 and each of the left and right plate spring pieces 16b, 16c are thereby divided in two parts. The plate spring 16 is one that is the same as the plate spring 16 in FIG. 11 except the inclusion of the cutouts 17. The plate spring 16 is fixed to the top surface 56a of the stay base 56 via the three screws 30. Three screw holes 70 of the top surface 56a are screw holes for the three screws 30 to be screwed thereinto. Also, one screw hole 66 of the top surface 56a is a screw hole for the screw 36 to be screwed thereinto from the lower side of the extension part 56b.

A columnar shaft 72 disposed coaxially with the pivot axis 60 is formed at a side surface of the stay base 56. An end of the shaft 72 connects to a wall 56*c* on one side of the stay base 56. Another end of the shaft 72 is a free end. A screw hole 74 is formed on a center axis (that is, the pivot axis 60) of the shaft 72. The screw hole 74 opens at the free end of the shaft 72. Around an outer circumference of the shaft 72, a semicircular void space 76 is formed coaxially with the shaft 72. Three steel balls 78 are embedded and fixed in a wall surface of a deepest part of the void space 76, that is, an inner wall surface 56*d* of the wall 56*c* in such a manner that each of the three steel balls 78 is embedded in a depth that is slightly larger than a half of a diameter of the steel ball 78. Therefore, a remaining part of each of the three steel balls 78, the part being a part that is slightly smaller than the half of the diameter, projects from the inner wall surface 56*d*. The three steel balls 78 are disposed at equal intervals of 120 degrees in a direction around the pivot axis 60 (see FIG. 13A). The three steel balls 78 enable changing a tilting angle of the stay body 54 in three positions.

Figure 13A:
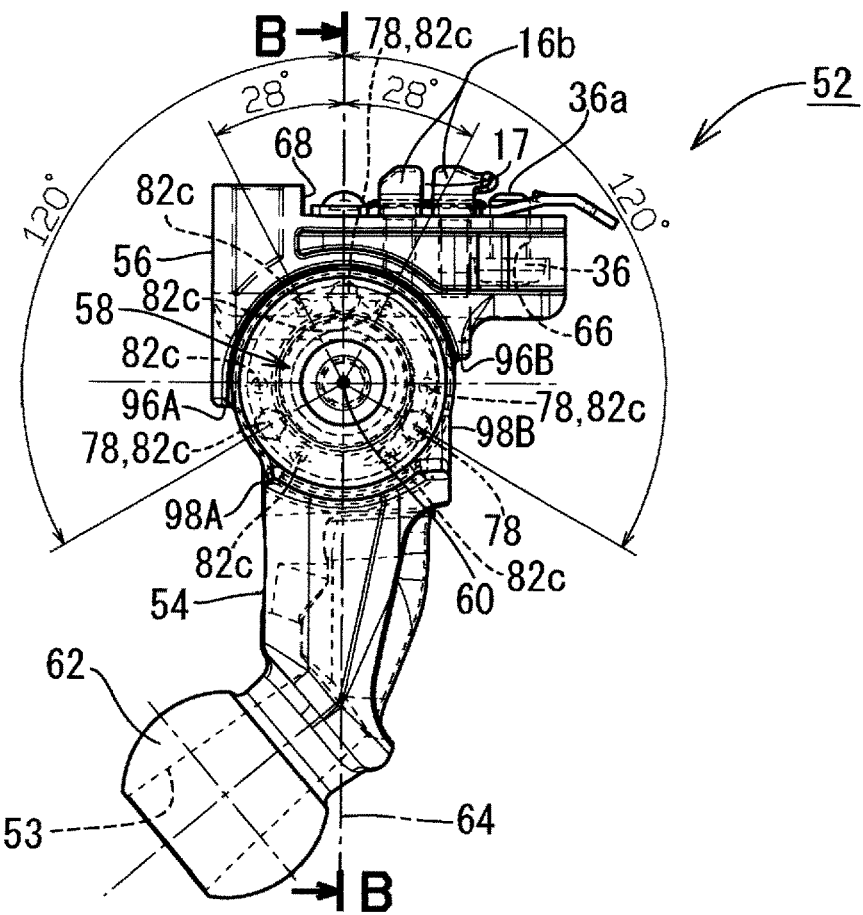
FIG. 13A is a side view of the stay in FIGS. 11A to 11C.

In FIG. 12, a cylindrical part 80 to be disposed coaxially with the pivot axis 60 is formed at an upper part of the stay body 54. An end of the cylindrical part 80 connects to a disk 82 having a diameter that is larger than that of the cylindrical part 80. Another end of the cylindrical part 80 is a free end. A hollow 84 having a uniform inner diameter is formed through the cylindrical part 80 and the disk 82 coaxially with the cylindrical part 80 and the disk 82. The disk 82 and the cylindrical part 80 are received in the void space 76 while the shaft 72 is inserted to the hollow 84, and the stay body 54 is thereby supported by the stay base 56 so as to be pivotable (that is, tiltable) in the direction around the axis of the pivot axis 60. In this state, a metal coil spring 86 (abutment surface pressing spring) is fitted on a circumference of the cylindrical part 80 loosely (that is, the coil spring 86 can contract and expand in the axis direction). At this time, an end of the coil spring 86 abuts on and is supported by one surface 82*a* of the disk 82. Since the coil spring 86 is longer than the cylindrical part 80 in the axis direction, another end of the coil spring 86 projects outward relative to the free end of the cylindrical part 80. A metal washer 88 is brought into abutment with the other end of the coil spring 86. A screw through hole 88*a* is formed at a center of the metal washer 88. A joining screw 90 is screwed into the screw hole 74 through the screw through hole 88*a* to press the coil spring 86 via the metal washer 88. Consequently, the stay body 54 is joined to the stay base 56 and the stay body 54 is prevented from coming off from the stay base 56. The joining screw 90 is disposed on the pivot axis 60. A pressing force of the coil spring 86 brings the inner wall surface 56*d* (abutment surface) of the wall 56*c* of the stay base 56 and another surface 82*b* (abutment surface) of the disk 82 of the stay body 54 into pressure abutment with each other with the three steel balls 78 interposed therebetween. Each of the inner wall surface 56*d* and the other surface 82*b* is a surface around the pivot axis 60. A configuration for changing the tilting angle of the stay body 54 in three positions via the steel balls 78 will be described. Recesses 82*c* (FIG. 15) that allow the three steel balls 78 to be removably fitted therein are formed in the other surface 82*b* of the disk 82. For each steel ball 78, three recesses 82*c* are formed at equal intervals in the direction around the pivot axis 60 (see FIG. 13A). Consequently, when the stay body 54 is tilted relative to the stay base 56 (that is, the stay body 54 is made to pivot in the direction around the pivot axis 60), each of the three steel balls 78 embedded in the inner wall surface 56*d* of the wall 56*c* of the stay base 56 is successively moved and fitted in the three recesses 82*c*. Consequently, the tilting angle of the stay body 54 can be changed, for example, in unit of 28 degrees in three positions as illustrated in FIG. 13A. Note that FIG. 13A illustrates a state in which the tilting angle of the stay body 54 is set at a neutral position (that is, a second position in the three positions). A force of holding of the stay body 54 by the stay base 56 can be adjusted using the amount of fastening of the joining screw 90. In other words, a range from a start of compression of the coil spring 86 by the metal washer 88 via fastening of the joining screw 90 to stoppage of the fastening due to the metal washer 88 abutting on the end surface 72*a* of the shaft 72 is set as a possible fastening range for the joining screw 90. The possible fastening range corresponds to a difference in length between the coil spring 86 in a non-compressed state and the cylindrical part 80. As the joining screw 90 is fastened more within the possible fastening range, the coil spring 86 is compressed more and the force of pressing the abutment surfaces 56*d*, 82*b* against each other is thus increased. As a result, a sliding resistance in the direction around the pivot axis 60 between the abutment surfaces 56*d*, 82*b* is increased, increasing the force of holding of the stay body 54 by the stay base 56. The holding force of the stay base 56 for holding the stay body 54 can be adjusted to a proper magnitude by adjusting the fastening amount according to the length of the stay body 54 and/or the weight of the inner mirror body 18. For example, if the stay body 54 is long and/or if the inner mirror body 18 is heavy (that is, if large moment is applied to the pivoting connection part 58), the amount of fastening the joining screw 90 is increased to increase the holding force, enabling suppression of vibration of the stay body 54.

Note that as illustrated in FIG. 12, instead of the steel balls 78, resin washers 79 can be put on the shaft 72 and received in the void space 76. In the example in FIG. 12, two resin washers 79 each formed of, e.g., acrylic resin are put together and disposed. In this case, the pressing force of the coil spring 86 brings the inner wall surface 56*d* of the wall 56*c* of the stay base 56 and the other surface 82*b* of the disk 82 of the stay body 54 into pressure abutment with each other with the two resin washers 79 interposed therebetween. Upon the stay body 54 being tilted relative to the stay base 56, the two resin washers 79 slide on each other. Consequently, the tilting angle of the stay body 54 can be adjusted steplessly. Also, instead of causing the abutment surfaces 56*d*, 82*b* of the stay base 56 and the stay body 54 to slide on and abut on each other via another member (the steel balls 78 or the resin washers 79 in the above-described examples), the titling angle of the stay body 54 can be adjusted steplessly by causing the abutment surfaces 56*d*, 82*b* of the stay base 56 and the stay body 54 to slide on and abut on each other directly with no other member interposed therebetween.

Also, as illustrated in FIG. 12, instead of a combination of the coil spring 86 and the metal washer 88, a single metal plate spring 92 (abutment surface pressing spring) can be used. The plate spring 92 includes a round center part 92*a* at a center of a surface and also includes four legs 92*b* extending in four directions from an outer circumference of the center part 92*a*. The respective legs 92*b* are flexed mutually inward around respective boundaries with the center part 92*a* and further flexed outward around respective free ends. A screw through hole 92*c* is formed at a center of the center part 92*a*. Where the plate spring 92 is used, the stay base 56 and the stay body 54 are assembled as follows. While the shaft 72 is inserted to the hollow 84, the disk 82 and the cylindrical part 80 are received in the void space 76. Consequently, the stay body 54 is supported by the stay base 56 so as to be pivotable (that is, tiltable) in a direction around the pivot axis 60. In this state, the plate spring 92 is fitted on the outer circumference of the cylindrical part 80 loosely (that is, the plate spring 92 can contract and expand in the axis direction). At this time, the center part 92a of the plate spring 92 faces the end surface 72a of the shaft 72 and the four legs 92b are disposed so as to surround the outer circumference of the cylindrical part 80. The free end of each leg 92b abuts on and is supported by the one surface 82a of the disk 82. A void space is formed between the end surface 72a of the shaft 72 and a surface of the center part 92a of the plate spring 92, the surface facing the end surface 72a. A joining screw 90 is passed through the screw through hole 92c and screwed into the screw hole 74 and a head of the joining screw 90 thereby presses the center part 92a of the plate spring 92. Consequently, the stay body 54 is joined to the stay base 56 and the stay body 54 is thereby prevented from coming off from the stay base 56. The joining screw 90 is disposed on the pivot axis 60. The center part 92a of the plate spring 92 is pressed, causing the legs 92b to bend (elastically deform). A pressing force caused by the bending of the legs 92b is applied to the one surface 82a of the disk 82. The pressing force brings the inner wall surface 56d (abutment surface) of the wall 56c of the stay base 56 and the other surface 82b (abutment surface) of the disk 82 of the stay body 54 into pressure abutment with each other via the three steel balls 78 or the resin washers 79. A force of holding of the stay body 54 by the stay base 56 can be adjusted using the amount of fastening of the joining screw 90. In other words, a range from a start of compression of the plate spring 92 by the head of the joining screw 90 via fastening of the joining screw 90 to stoppage of the fastening due to the center part 92a of the plate spring 92 abutting on the end surface 72a of the shaft 72 joining screw 90 is set as a possible fastening range. The possible fastening range corresponds to a length, in the direction along the pivot axis 60, of the void space between the center part 92a of the plate spring 92 in a non-compressed state and the end surface 72a of the shaft 72. As the joining screw 90 is fastened more within the possible fastening range, the plate spring 92 is compressed more (that is, the legs 92b bend more), and the force of pressing the abutment surfaces 56d, 82b against each other is thus increased. As a result, the sliding resistance in the direction around the pivot axis 60 between the abutment surfaces 56d, 82b is increased, increasing the force of holding of the stay body 54 by the stay base 56. The force of the stay base 56 for holding the stay body 54 can be adjusted to a proper magnitude by adjusting the fastening amount according to the length of the stay body 54 and/or the weight of the inner mirror body 18. For example, if the stay body 54 is long and/or if the inner mirror body 18 is heavy (that is, large moment is applied to the pivoting connection part 58), the amount of fastening the joining screw 90 is increased to increase the holding force, enabling suppression of vibration of the stay body 54.

After the stay base 56 and the stay body 54 being assembled, the stay base 56 and the pivoting connection part 58 are covered by decorative covers 94A, 94B from the left and right sides and thereby become invisible from the outside.

Figure 13B:
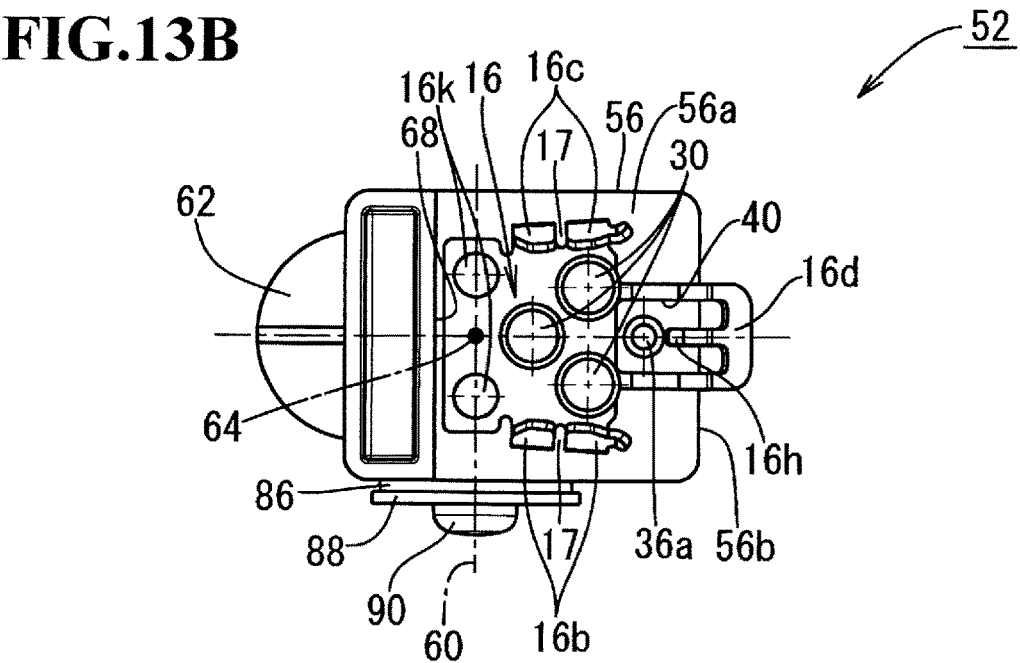
FIG. 13B is a plan view of the stay in FIGS. 11A to 11C.
Figure 13C:
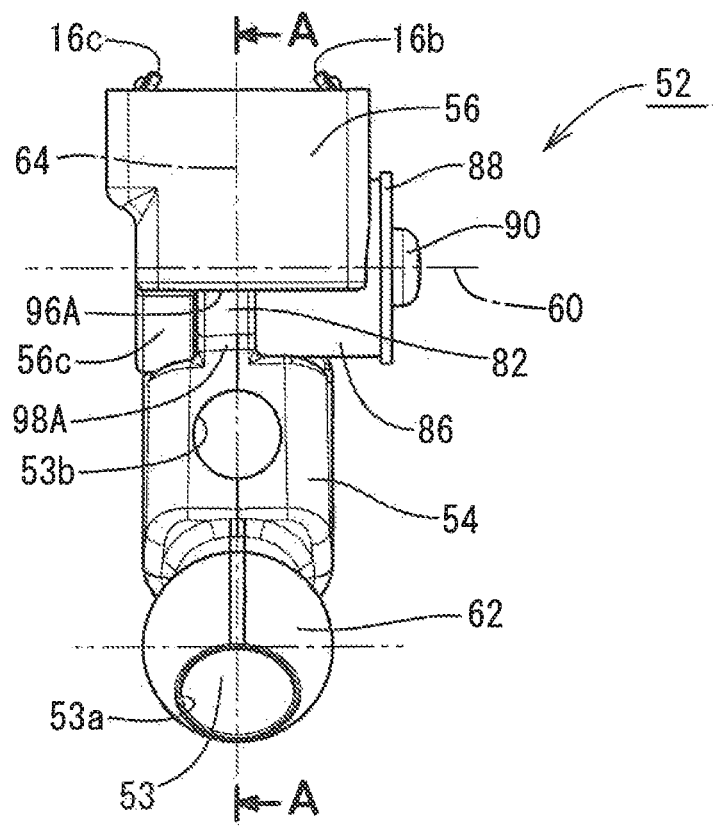
FIG. 13C is a front view of the stay in FIGS. 11A to 11C.

FIGS. 13A, 13B and 13C are a side view, a plan view and a front view of the stay 52 formed of the above-described components, respectively. In these figures, the stay 52 is illustrated in a position in which the center axis 64 of the stay base 56 is disposed vertically. Also, for adjustment of the tilting angle of the stay body 54, the three-position changeover method using the steel balls 78 is employed and the tilting angle is set at a neutral position (that is, the second position in the three positions). Also, for the abutment surface pressing spring, the coil spring 86 is employed. The stay body 54 is joined to the stay base 56 so as to be pivotable in the direction around the pivot axis 60. A pivoting stopping part 96A is formed on the front side of a lower surface of the stay base 56 and a pivoting stopping part 96B is formed on the back side of the stay base 56. A part immediately below the disk 82 on the front side of the stay body 54 forms a pivoting stopped part 98A that abuts on the pivoting stopping part 96A. A part immediately below the disk 82 on the back side of the stay body 54 forms a pivoting stopped part 98B that abuts on the pivoting stopping part 96B. An action of the stay body 54 pivoting toward the front side (that is, toward the rear side of the vehicle) is mechanically stopped by the pivoting stopped part 98A abutting on the pivoting stopping part 96A. Also, an action of the stay body 54 pivoting toward the back side (that is, toward the front side of the vehicle) is mechanically stopped by the pivoting stopped part 98B abutting on the pivoting stopping part 96B.

Figure 14:
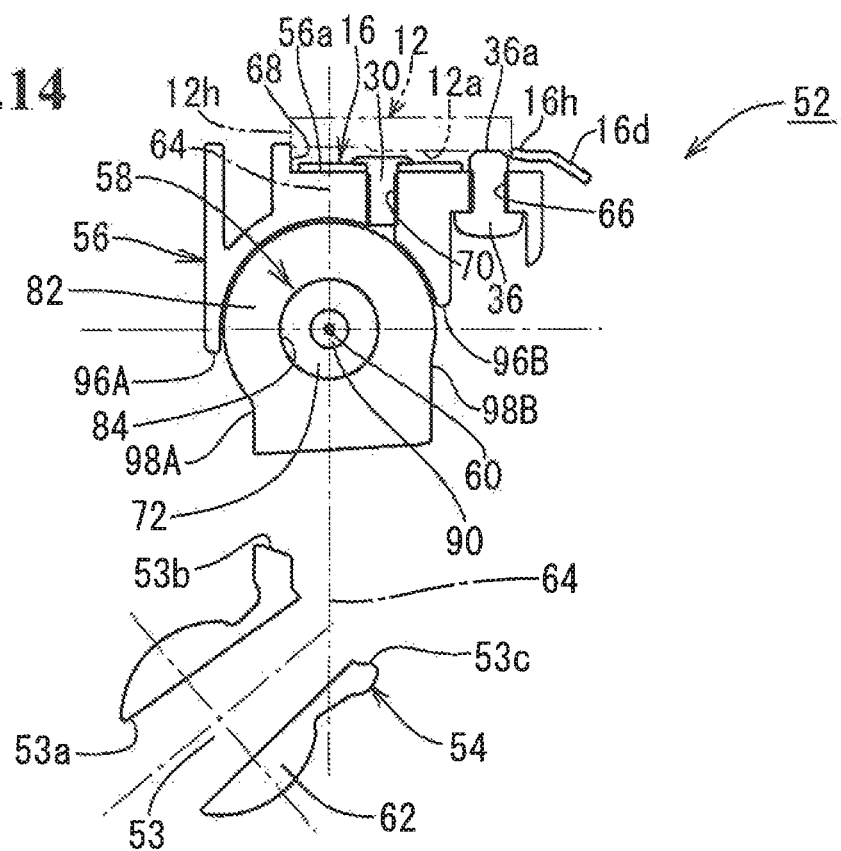
FIG. 14 is an arrow A-A sectional view of FIG. 13C and illustrates a state in which the stay attached and fixed to the attachment base.

FIG. 14 illustrates an arrow A-A sectional view (cut end surface) of FIG. 13C. In FIG. 14, the stay 52 is attached and fixed to the attachment base 12. A hollow 53 is formed in the stay body 54. A lower end of the hollow 53 opens in a part of a surface of the pivot 62 and forms a lower opening 53a. The front side of an upper end of the hollow 53 opens in a front surface of the stay body 54 and thus forms an upper front opening 53b. The back side of the upper end of the hollow 53 opens in a back surface of the stay body 54 and forms an upper back opening 53c. A harness (not illustrated) connecting the vehicle body side and various electric components inside the inner mirror body 18 is passed through the hollow 53.

Figure 15:
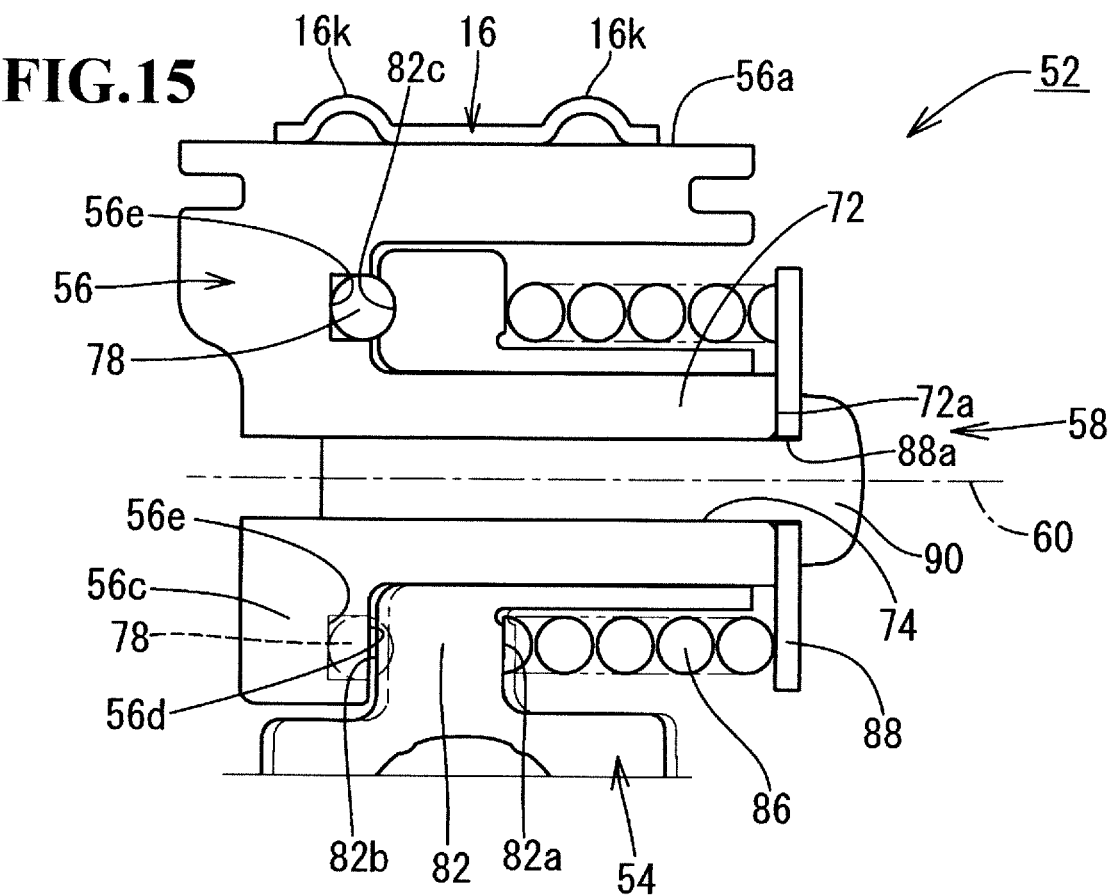
FIG. 15 is an enlarged partial sectional view of FIG. 13A at a position indicated by arrow B-B and illustrates an enlargement of a pivoting connection part.

FIG. 15 illustrates an enlarged partial cross-section at a position indicated by arrow B-B in FIG. 13A. The cross-section indicates the pivoting connection part 58 cut along a vertical plane extending through the pivot axis 60 and the center axis 64 of the stay base 56. In the inner wall surface 56d of the wall 56c of the stay base 56, three recesses 56e are formed at respective positions at equal intervals of 120 degrees in the direction around the pivot axis 60. In each recess 56e, a steel ball 78 is embedded and fixed in the depth that is slightly larger than the half of the diameter of the steel ball 78. Therefore, a part of each steel ball 78 projects from the inner wall surface 56d. The recesses 82c are formed in the other surface 82b of the disk 82 of the stay body 54. The projecting parts of the steel balls 78 are removably fitted in the respective recesses 82c. The disk 82 is pressed toward the wall 56c by the coil spring 86. Consequently, the inner wall surface 56d of the wall 56c of the stay base 56 and the other surface 82b of the disk 82 of the stay body 54 come into pressure abutment with each other via the three steel balls 78. At this time, the projecting parts of the steel balls 78 are fitted in the respective recesses 82c, enabling the tilting angle of the stay body 54 relative to the stay base 56 to be held stably. If a pivoting force in the direction around the pivot axis 60, the pivoting force being equal to or exceeding a predetermined value, is provided to the stay body 54, the steel balls 78 move off from the respective recesses 82c against the pressing force of the coil spring 86 and can be fitted in respective circumferentially-adjacent other recesses 82c. Consequently, the tilting angle of the stay body 54 can be changed in three positions.

A procedure for attaching the inner mirror 50 (FIGS. 11A to 11C) having the above-described configuration to a surface on the vehicle interior side of a front windshield of a vehicle via the attachment base 12 is the same as the inner mirror 10 attachment procedure described in Embodiment 1 and thus description thereof will be omitted. Note that as in Embodiment 1, when the screw 36 is handled to attach or detach the inner mirror 50 to or from the attachment base 12, the stay body 54 is largely tilted to the vehicle rear side with the pivoting connection part 58 as a center for evacuation, enabling preventing the stay body 54 from interrupting the handling of the screw 36.

An avoidance action of the inner mirror 50 when a shock is applied to the inner mirror 50 attached to a surface on the vehicle interior side of a front windshield of a vehicle via the attachment base 12 is performed as follows. Upon application of an external force toward the vehicle front side to the inner mirror 50 as a result of, e.g., an occupant colliding with the inner mirror body 18, in FIG. 11A, first, the stay body 54 pivots to the vehicle front side with the pivoting connection part 58 as a center to allow the external force to escape (first-step avoidance operation). If the provision of the external force is continued and the pivoting stopped part 98B of the stay body 54 abuts on the pivoting stopping part 96B of the stay base 56, the pivoting of the stay body 54 is mechanically stopped. If an external force toward the vehicle front side, the external force having a value that is equal to or exceeds a predetermined value, is further applied to the inner mirror 50 from this state, the fitting between the attachment base 12 and the plate spring 16 is cancelled (at this time, elastic fracture occurs in the plate spring 16) and the inner mirror 50 drops off from the attachment base 12, together with the stay 52 (second-step avoidance action). This drop-off action can occur in either rotational drop-off mode or sliding drop-off mode. Consequently, safety of the occupant is ensured.

As a conventional drop-off mechanism-equipped attachment structure in which a support part includes a support part base with a plate spring attached thereto, and a support part body that is pivotally joined to the support part base via a pivoting connection part and supports an in-vehicle device body of an in-vehicle device, there is an inner mirror attachment structure described in Patent Literature 4. As in Embodiment 2, the inner mirror attachment structure described in Patent Literature 4 performs a two-step avoidance action. However, the attachment structure described in Patent Literature 4 cannot perform a sliding drop-off action. Also, a screw (12) described in Patent Literature 4 cannot enable fine adjustment of a holding force. Also, even if a holding force is temporarily adjusted, slight loosening of the screw (12) causes a substantial decrease of the holding force and thus, chatter vibration easily occurs in the mirror body during running of the vehicle. On the other hand, the attachment structure for the inner mirror 50 according to Embodiment 2 can perform either a rotational drop-off action or a sliding drop-off action. Also, in the attachment structure for an inner mirror according to Embodiment 2, an abutment surface pressing spring (the coil spring 86 or the plate spring 92) is disposed between the pivoting connection part 58 and the joining screw 90, and thus, the holding force of the stay base 56 for holding the stay body 54 can finely be adjusted using the amount of fastening the joining screw 90. Therefore, if the stay body 54 is long and/or if the inner mirror body 18 is heavy (that is, large moment is applied to the pivoting connection part 58), the amount of fastening of the joining screw 90 is increased to increase the holding force, enabling suppression of vibration of the stay body 54. Also, since the abutment surface pressing spring 86 or 92 is disposed between the pivoting connection part 58 and the joining screw 90, even if the joining screw 90 is loosened to some extent, a substantial decrease of the holding force can be suppressed.

Also, as a conventional attachment structure in which a support part includes a support part base and a support part body that is pivotally joined to the support part base via a pivoting connection part and supports an in-vehicle device body of an in-vehicle device, there is an attachment structure for an inner mirror described in Patent Literature 5. However, an avoidance action in the attachment structure described in Patent Literature 5 has one step, and no avoidance action of drop-off of an inner mirror can be performed. Also, in the attachment structure described in Patent Literature 5, a holding force of the support part base holding the support part body cannot be adjusted. On the other hand, in the attachment structure of an inner mirror according to Embodiment 2, a two-step avoidance action can be performed, and in addition, either a rotational drop-off action or a sliding drop-off action can be performed. Also, in the attachment structure of an inner mirror according to Embodiment 2, since the abutment surface pressing spring 86 or 92 is disposed between the pivoting connection part 58 and the joining screw 90, the holding force of the stay base 56 for holding the stay body 54 can finely be adjusted using the amount of fastening the joining screw 90.

Although in Embodiment 2, a protrusion is formed of two projections 16k, 16k aligned in the direction parallel to the direction in which the left and right plate spring pieces 16b, 16c face each other, the configuration and arrangement of the protrusion are not limited to this example. For example, as illustrated in FIG. 10 referred to in the description of an alteration of Embodiment 1, the protrusion can be formed of a single ridge 16k' extending in the direction in which the left and right plate spring pieces 16b, 16c face each other. Also, although in Embodiment 2, the protrusion is formed at the plate spring 16, the protrusion is not limited to this example. For example, the protrusion can be formed at the top surface 56a of the stay base 56 itself.

Although in Embodiments 1 and 2, the plate spring 16 is attached to the stay 20, 52 (stay base 24, 56) via the screws 30 (e.g., FIGS. 1 and 12), the method of attachment of a plate spring to a stay is not limited to this method. For example, it is possible that a plate spring is disposed in a mold for resin molding of a stay to attach the plate spring to the stay by means of insert molding. Also, as another method, it is possible that a rivet through hole is formed in each of a plate spring and a stay, a rivet is passed through the rivet through hole of the stay from the rivet through hole of the plate spring and a distal end of the rivet is swaged at the back side of the stay to attach the plate spring to the stay. Also, although in Embodiments 1 and 2 described above, in the stay base, the protrusion is disposed on the front side in the sliding-in direction of the attachment base and the screw distal end is disposed on the rear side in the sliding-in direction, contrarily, it is possible that the protrusion is disposed on the rear side in the sliding-in direction of the attachment base and the screw distal end is disposed on the front side in the sliding-in direction. Also, although in Embodiments 1 and 2 described above, one screw is used for pressing the attachment base, two or more screws can be used for pressing the attachment base. Also, although in Embodiments 1 and 2 described above, the stay is divided into the stay base and the stay body, this invention is applicable also to an inner mirror including a stay of a single-piece structure that is not divided into a stay base and a stay body. Also, although in Embodiments 1 and 2 described above, the inner mirror is divided into the stay and the inner mirror body, this invention is applicable also to an inner mirror of a single-piece structure that is not divided into a stay and an inner mirror body (that is, an inner mirror having a structure integrated with a support part). Also, although in each of Embodiments 1 and 2 above has been described in terms of a case where this invention is applied to an attachment structure for an inner mirror (in-vehicle viewing device), this invention is applicable also to an attachment structure for an in-vehicle camera or another in-vehicle device.

The invention claimed is:

1. A drop-off mechanism-equipped attachment structure for an in-vehicle device, the attachment structure attaching an in-vehicle device to an attachment base fixed to a vehicle interior in such a manner that the in-vehicle device can drop off, the attachment structure comprising:
a support part of the in-vehicle device, a plate spring attached to the support part and a screw screwed into the support part, wherein:
the plate spring includes left and right plate spring pieces facing each other with a space interposed therebetween;
the plate spring has a structure that allows the attachment base to slide into the space and thereby receives the attachment base and causes the attachment base to be fitted in the plate spring in a direction orthogonal to a direction of the sliding-in by the reception;
the screw is fastened in a state in which the attachment base is fitted in the plate spring and screwed into the support part so that a front surface of the attachment base is pressed by a screw distal end that is a distal end of the screw to generate an appropriate force of fitting between the attachment base and the left and right plate spring pieces and thereby cause the attachment base and the left and right plate spring pieces to be elastically fitted together; and
the attachment structure attaches the in-vehicle device to the attachment base via the plate spring using the elastic fitting, and when an external force that is equal to or exceeds a predetermined value is applied to the in-vehicle device attached to the attachment base, cancels the elastic fitting and causes the in-vehicle device to drop off from the attachment base.

2. The drop-off mechanism-equipped attachment structure for an in-vehicle device according to claim 1, wherein the force of fitting between the attachment base and the left and right plate spring pieces can be adjusted using an amount of fastening of the screw.

3. The drop-off mechanism-equipped attachment structure for an in-vehicle device according to claim 1, wherein:
the support part includes a protrusion that abuts on a position in the front surface of the attachment base, the position being different from a position where the screw distal end abuts; and
a direction in which the screw distal end and the protrusion are aligned, the direction being a direction in which the screw distal end and the protrusion face each other, is set to be a direction intersecting with a direction in which the left and right plate spring pieces face each other.

4. A drop-off mechanism-equipped attachment structure for an in-vehicle device, the attachment structure attaching an in-vehicle device to an attachment base fixed to a vehicle interior in such a manner that the in-vehicle device can drop off, the attachment structure comprising:
a support part of the in-vehicle device, a plate spring attached to the support part and a screw screwed into the support part, wherein:
the plate spring includes left and right plate spring pieces facing each other with a space interposed therebetween;
the plate spring has a structure that allows the attachment base to slide into the space and thereby receives the attachment base and causes the attachment base to be fitted in the plate spring in a direction orthogonal to a direction of the sliding-in by the reception;
the screw is fastened in a state in which the attachment base is fitted in the plate spring and screwed into the support part so that a front surface of the attachment base is pressed by a screw distal end that is a distal end of the screw to generate an appropriate force of fitting between the attachment base and the left and right plate spring pieces and thereby cause the attachment base and the left and right plate spring pieces to be elastically fitted together;
the attachment structure attaches the in-vehicle device to the attachment base via the plate spring using the elastic fitting, and when an external force that is equal to or exceeds a predetermined value is applied to the in-vehicle device attached to the attachment base, cancels the elastic fitting and causes the in-vehicle device to drop off from the attachment base;
the support part includes a protrusion that abuts on a position in the front surface of the attachment base, the position being different from a position where the screw distal end abuts;
a direction in which the screw distal end and the protrusion are aligned, the direction being a direction in which the screw distal end and the protrusion face each other, is set to be a direction intersecting with a direction in which the left and right plate spring pieces face each other; and
the screw distal end and the protrusion are disposed at respective positions on opposite outer sides of a region in which the left and right plate spring pieces face each other with the region interposed therebetween.

5. The drop-off mechanism-equipped attachment structure for an in-vehicle device according to claim 3, wherein the screw is formed of one screw, and the protrusion is formed of two projections aligned in a direction parallel to the direction in which the left and right plate spring pieces face each other.

6. The drop-off mechanism-equipped attachment structure for an in-vehicle device according to claim 1, wherein the screw distal end has a non-acute shape.

7. The drop-off mechanism-equipped attachment structure for an in-vehicle device according to claim 1, wherein:
the plate spring includes a lug at a position at which the lug faces the attachment base when the attachment base slides into the plate spring;
the lug includes a hook; and
when the attachment base is slid in, the attachment base slides into the space while making the lug elastically deform and climbing over the hook, and upon the attachment base reaching a predetermined attachment position after climbing over the hook, the hook engages with a predetermined position in the attachment base via elasticity of the lug and thereby suppresses backward movement of the attachment base.

8. A drop-off mechanism-equipped attachment structure for an in-vehicle device, the attachment structure attaching an in-vehicle device to an attachment base fixed to a vehicle interior in such a manner that the in-vehicle device can drop off, the attachment structure comprising:

a support part of the in-vehicle device, a plate spring attached to the support part and a screw screwed into the support part, wherein:

the plate spring includes left and right plate spring pieces facing each other with a space interposed therebetween;

the plate spring has a structure that allows the attachment base to slide into the space and thereby receives the attachment base and causes the attachment base to be fitted in the plate spring in a direction orthogonal to a direction of the sliding-in by the reception;

the screw is fastened in a state in which the attachment base is fitted in the plate spring and screwed into the support part so that a front surface of the attachment base is pressed by a screw distal end that is a distal end of the screw to generate an appropriate force of fitting between the attachment base and the left and right plate spring pieces and thereby cause the attachment base and the left and right plate spring pieces to be elastically fitted together;

the attachment structure attaches the in-vehicle device to the attachment base via the plate spring using the elastic fitting, and when an external force that is equal to or exceeds a predetermined value is applied to the in-vehicle device attached to the attachment base, cancels the elastic fitting and causes the in-vehicle device to drop off from the attachment base;

the plate spring includes a lug at a position at which the lug faces the attachment base when the attachment base slides into the plate spring;

the lug includes a hook;

when the attachment base is slid in, the attachment base slides into the space while making the lug elastically deform and climbing over the hook, and upon the attachment base reaching a predetermined attachment position after climbing over the hook, the hook engages with a predetermined position in the attachment base via elasticity of the lug and thereby suppresses backward movement of the attachment base; and the lug includes an opening that allows entry of the screw distal end.

9. The drop-off mechanism-equipped attachment structure for an in-vehicle device according to claim 1, wherein:

the support part includes a support part base with the plate spring attached thereto, and a support part body that is pivotally joined to the support part base via a pivoting connection part and supports an in-vehicle device body of the in-vehicle device; and when an external force is applied to the support part body, before the elastic fitting is cancelled, the support part body pivots relative to the support part base with the pivoting connection part as a center to allow the external force to escape, and when an external force that is equal to or exceeds a predetermined value is further applied to the support part body after the pivoting of the support part body is mechanically stopped at an end of a pivoting range, the elastic fitting provided by the plate spring is cancelled and the in-vehicle device drops off from the attachment base.

10. The drop-off mechanism-equipped attachment structure for an in-vehicle device according to claim 9, wherein:

the support part base includes a pivoting stopping part that defines the pivoting range for the support part body; and when an angle of pivoting of the support part body reaches a predetermined value, the pivoting stopping part abuts on a pivoting stopped part of the support part body and mechanically prevents further pivoting of the support part body.

11. The drop-off mechanism-equipped attachment structure for an in-vehicle device according to claim 9, wherein the support part body can evacuate from the position for handling of the screw by making the support part body pivot via the pivoting connection part.

12. The drop-off mechanism-equipped attachment structure for an in-vehicle device according to claim 9, wherein a pivot axis of the pivoting connection part is configured to be disposed in a position in which the pivot axis extends in a direction that is a vehicle width direction and a horizontal direction when the attachment structure is mounted in a vehicle.

13. The drop-off mechanism-equipped attachment structure for an in-vehicle device according to claim 12, wherein:

the pivoting connection part has a structure in which the support part base and the support part body are joined via a joining screw disposed on the pivot axis in such a manner that the support part base and the support part body can pivot relative to each other;

the support part base and the support part body include respective abutment surfaces disposed so as to abut on each other directly or indirectly via another member and be slidable relative to each other in a direction around the pivot axis, at the pivoting connection part;

an abutment surface pressing spring that causes the abutment surfaces to be pressed against each other is disposed between the pivoting connection part and the joining screw; and a magnitude of an external force necessary for causing the support part body to pivot can be adjusted by adjusting a force of pressing the abutment surfaces against each other with an amount of screwing-in of the joining screw, the force being provided by the abutment surface pressing spring.

* * * * *